(12) United States Patent
Shellhammer et al.

(10) Patent No.: US 12,375,251 B2
(45) Date of Patent: Jul. 29, 2025

(54) BANDWIDTH INDICATIONS FOR A SECONDARY 160 MHZ CHANNEL

(71) Applicant: QUALCOMM Incorporated, San Diego, CA (US)

(72) Inventors: Stephen Jay Shellhammer, Ramona, CA (US); Bin Tian, San Diego, CA (US); Jialing Li Chen, San Diego, CA (US); Sameer Vermani, San Diego, CA (US); Kanke Wu, San Diego, CA (US); Youhan Kim, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/330,393

(22) Filed: May 25, 2021

(65) Prior Publication Data
US 2022/0385437 A1    Dec. 1, 2022

(51) Int. Cl.
*H04L 5/00* (2006.01)
*H04L 1/00* (2006.01)

(52) U.S. Cl.
CPC .......... *H04L 5/0092* (2013.01); *H04L 1/0069* (2013.01); *H04L 5/0005* (2013.01)

(58) Field of Classification Search
CPC .................................................... H04L 1/0069
See application file for complete search history.

(56) References Cited

U.S. PATENT DOCUMENTS

| 2019/0097850 A1 | 3/2019 | Kenney et al. |
| 2020/0305226 A1* | 9/2020 | Sakamoto ........... H04L 27/2605 |
| 2021/0258115 A1* | 8/2021 | Liu ........................ H04L 5/0044 |

FOREIGN PATENT DOCUMENTS

WO    WO-2019032216 A1    2/2019

OTHER PUBLICATIONS

International Search Report and Written Opinion—PCT/US2022/030015—ISA/EPO—Jul. 25, 2022.

* cited by examiner

*Primary Examiner* — Jianye Wu
(74) *Attorney, Agent, or Firm* — Arun Swain

(57) ABSTRACT

This disclosure provides methods, devices and systems for wireless communications over a 320 MHz bandwidth. Some implementations more specifically relate to signaling techniques for indicating the bandwidth of a physical layer convergence protocol (PLCP) protocol data unit (PPDU) transmitted in a secondary 160 MHz channel of the 320 MHz bandwidth. In some implementations, an access point (AP) may transmit an aggregated PPDU (A-PPDU) that includes a first sub-PPDU transmitted within a primary 160 MHz channel and a second sub-PPDU transmitted within a secondary 160 MHz channel. In such implementations, the first sub-PPDU may carry bandwidth information indicating the bandwidth of the first sub-PPDU within the primary 160 MHz channel and the second sub-PPDU may carry bandwidth information indicating the 320 MHz bandwidth.

29 Claims, 15 Drawing Sheets

BANDWIDTH INDICATIONS FOR A SECONDARY 160 MHZ CHANNEL

TECHNICAL FIELD

This disclosure relates generally to wireless communication, and more specifically to bandwidth indication techniques for packet transmissions in a secondary 160 MHz channel.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Existing versions of the IEEE 802.11 standard support packet transmissions on bandwidths up to 160 MHz. New WLAN communication protocols are being developed to enable enhanced WLAN communication features such as, for example, increases in bandwidth up to 320 MHz and beyond. As a result, the 160 MHz bandwidth supported by existing versions of the IEEE 802.11 standard is referred to as a "primary 160 MHz channel" and the remaining 160 MHz bandwidth of a 320 MHz channel is referred to as a "secondary 160 MHz channel." As new WLAN communication protocols enable enhanced features, new packet designs are needed to support packet transmissions over greater bandwidths. In particular, new signaling techniques are needed to indicate whether a packet is transmitted in the primary 160 MHz channel or the secondary 160 MHz channel.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include generating a first physical layer (PHY) convergence protocol (PLCP) protocol data unit (PPDU) having a PHY preamble that carries first bandwidth information indicating a bandwidth associated with the first PPDU, where the bandwidth indicated by the first bandwidth information is equal to 320 MHz; generating a second PPDU having a PHY preamble that carries second bandwidth information indicating a bandwidth associated with the second PPDU, where the bandwidth indicated by the second bandwidth information is less than or equal to 160 MHz; and transmitting the first PPDU and the second PPDU concurrently over the 320 MHz bandwidth in an aggregated PPDU (A-PPDU), where the first PPDU is transmitted on a first portion of the 320 MHz bandwidth and the second PPDU being transmitted on a second portion of the 320 MHz bandwidth, where the second portion spans the bandwidth indicated by the second bandwidth information.

In some aspects, the second portion may be located within a primary 160 MHz sub-band of the 320 MHz bandwidth and the second portion may be located within a secondary 160 MHz sub-band of the 320 MHz bandwidth. In some implementations, the PHY preamble of the first PPDU may further carry resource unit (RU) allocation information indicating one or more RUs or multiple RUs (MRUs) allocated for one or more respective users associated with the first PPDU, where each of the one or more RUs or MRUs is allocated within the first portion of the 320 MHz bandwidth.

In some other implementations, the PHY preamble of the first PPDU may further carry punctured channel information indicating one or more punctured channels representing a punctured bandwidth greater than or equal to 160 MHz. In such implementations, the punctured bandwidth may include at least the second portion of the 320 MHz bandwidth.

In some implementations, the punctured channel information may map to a channel puncturing pattern spanning a 160 MHz bandwidth that includes the first portion of the 320 MHz bandwidth and does not overlap with a 160 MHz bandwidth that includes the second portion of the 320 MHz bandwidth. In some other implementations, the punctured channel information may map to a channel puncturing pattern spanning an 80 MHz bandwidth that includes the first portion of the 320 MHz bandwidth.

In some implementations, the first PPDU may conform with a non-legacy PPDU format for non-orthogonal frequency division multiple access (non-OFDMA) transmission. In such implementations, the punctured channel information may comprise 6 bits in a universal signal field (U-SIG) of the PHY preamble of the first PPDU.

In some implementations, the first PPDU may conform with a first PPDU format and the second PPDU may conform with a second PPDU format. In some implementations, the PHY preamble of the first PPDU may include a first spatial reuse field and the PHY preamble of the second PPDU may include a second spatial reuse field, where the first spatial reuse field has the same spatial reuse value as the second spatial reuse field.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including generating a first PPDU having a PHY preamble that carries first bandwidth information indicating a bandwidth associated with the first PPDU, where the bandwidth indicated by the first bandwidth information is equal to 320 MHz; generating a second PPDU having a PHY preamble that carries second bandwidth information indicating a bandwidth associated with the second PPDU, where the bandwidth indicated by the second bandwidth information is less than or equal to 160 MHz; and transmitting the first PPDU and the second PPDU concurrently over the 320 MHz bandwidth in an A-PPDU, where the first PPDU is transmitted on a first portion of the 320 MHz bandwidth and the second PPDU is transmitted on a second portion of the 320 MHz bandwidth, where the second portion spans the bandwidth indicated by the second bandwidth information.

Another innovative aspect of the subject matter described in this disclosure can be implemented as a method of wireless communication. The method may be performed by a wireless communication device, and may include transmitting a trigger frame soliciting a trigger-based (TB) PPDU that includes a first sub-PPDU and a second sub-PPDU, where the trigger frame carries uplink bandwidth information indicating a bandwidth equal to 320 MHz; and receiving the TB PPDU responsive to the trigger frame, where the first sub-PPDU of the TB PPDU is received on a first portion of the 320 MHz bandwidth and has a PHY preamble carrying first bandwidth information indicating the 320 MHz bandwidth, where the second sub-PPDU of the TB PPDU is received on a second portion of the 320 MHz bandwidth and has a PHY preamble carrying second bandwidth information indicating a bandwidth less than or equal to 160 MHz, and where the second portion spans the bandwidth indicated by the second bandwidth information. In some aspects, the second portion may be located within a primary 160 MHz sub-band of the 320 MHz bandwidth and the first portion may be located within a secondary 160 MHz sub-band of the 320 MHz bandwidth.

In some aspects, the first sub-PPDU may conform with a first PPDU format and the sub-second PPDU may conform with a second PPDU format. In some implementations, the PHY preamble of the first sub-PPDU may include a first spatial reuse field associated with the second portion of the 320 MHz bandwidth and the PHY preamble of the second sub-PPDU may include a plurality of second spatial reuse fields associated with the second portion of the 320 MHz bandwidth. In some implementations, the plurality of second spatial reuse fields may be associated with a respective plurality spatial reuse values, where the first spatial reuse field has a spatial reuse value equal to the smallest of the plurality of spatial reuse values.

In some implementations, at least one of the plurality of second spatial reuse fields may have a value indicating that parameterized spatial reuse (PSR) and non-spatial reuse group (non-SRG) overlapping basic service set (OBSS) packet detection (PD)-based spatial reuse are prohibited during transmission of the TB PPDU, where the first spatial reuse field may also have a value indicating that PSR and non-SRG OBSS PD-based spatial reuse are prohibited during the transmission of the TB PPDU.

In some implementations, at least one of the second spatial reuse fields has a value indicating that PSR is prohibited during transmission of the TB PPDU, where the first spatial reuse field also has a value indicating that PSR is prohibited during transmission of the TB PPDU. In such implementations, none of the plurality of second spatial reuse fields may have a value indicating that non-SRG OBSS PD-based spatial reuse is prohibited during transmission of the TB PPDU.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including transmitting a trigger frame soliciting a TB PPDU that includes a first sub-PPDU and a second sub-PPDU, where the trigger frame carries uplink bandwidth information indicating a bandwidth equal to 320 MHz; and receiving the TB PPDU responsive to the trigger frame, where the first sub-PPDU of the TB PPDU is received on a first portion of the 320 MHz bandwidth and has a PHY preamble carrying first bandwidth information indicating the 320 MHz bandwidth, where the second sub-PPDU of the TB PPDU is received on a second portion of the 320 MHz bandwidth and has a PHY preamble carrying second bandwidth information indicating a bandwidth less than or equal to 160 MHz, and where the second portion spans the bandwidth indicated by the second bandwidth information.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
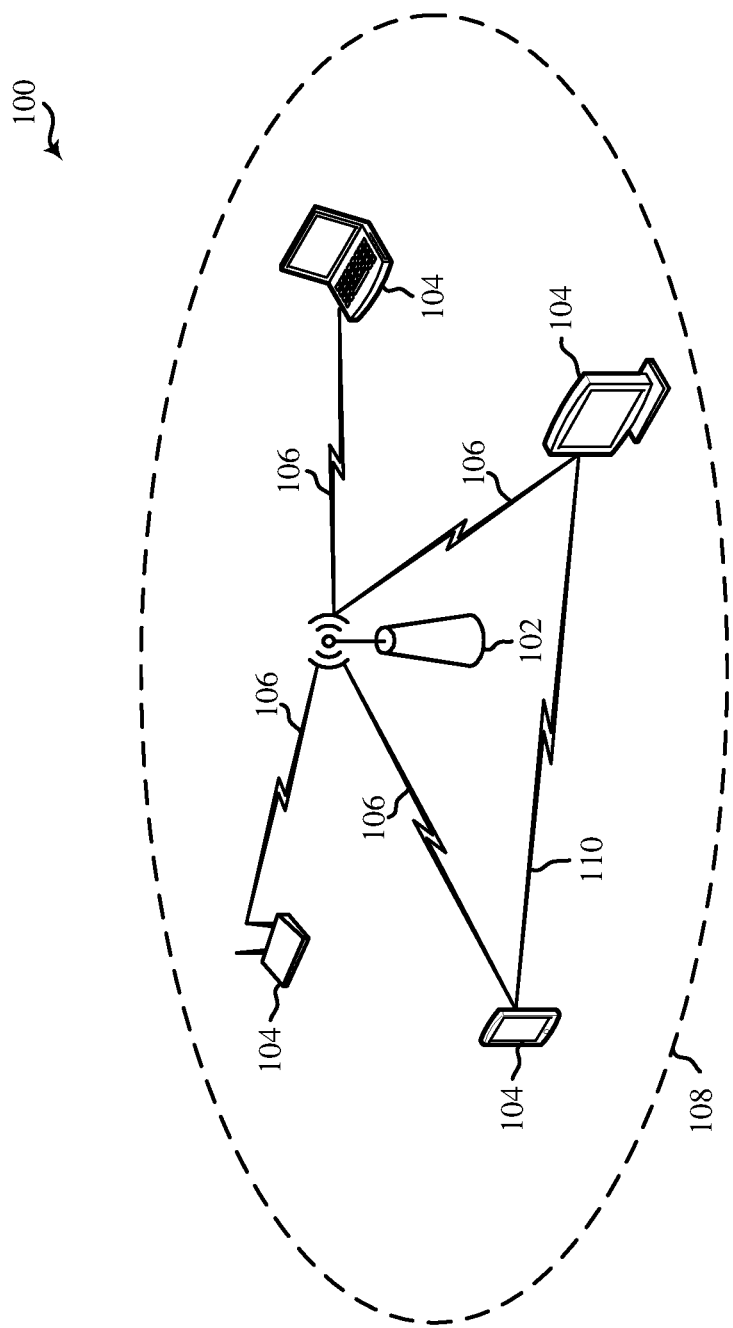
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various aspects relate generally to packet transmissions over a 320 MHz bandwidth, and more particularly, to signaling techniques for indicating the bandwidth of a physical layer convergence protocol (PLCP) protocol data unit (PPDU) transmitted in a secondary 160 MHz channel of the 320 MHz bandwidth. In some implementations, an access point (AP) may transmit an aggregated PPDU (A-PPDU) that includes a first sub-PPDU transmitted within a primary 160 MHz channel and a second sub-PPDU transmitted within a secondary 160 MHz channel. In some other implementations, an AP may solicit a trigger-based (TB) PPDU including a first sub-PPDU to be transmitted within a primary 160 MHz channel and a second sub-PPDU to be transmitted within a secondary 160 MHz channel. In either implementation, the first sub-PPDU may carry bandwidth information indicating the bandwidth of the first sub-PPDU within the primary 160 MHz channel and the second sub-PPDU may carry bandwidth information indicating a 320 MHz bandwidth. In some implementations, the second sub-PPDU may carry punctured channel information or RU allocation information further limiting the bandwidth of the second sub-PPDU to only a portion of the 320 MHz bandwidth that falls within the secondary 160 MHz channel.

Particular implementations of the subject matter described in this disclosure can be implemented to realize one or more of the following potential advantages. By signaling the bandwidth of a PPDU within a secondary 160 MHz channel, aspects of the present disclosure may improve medium utilization for packets transmitted in accordance with new WLAN communication protocols. Specifically, such signaling techniques support the transmissions of multiple PPDUs, concurrently, in an A-PPDU. For example, when an A-PPDU is transmitted over a 320 MHz bandwidth, the bandwidth of each sub-PPDU of the A-PPDU must be less than or equal to 160 MHz. However, aspects of the present disclosure recognize that STAs operating in accordance with existing versions of the IEEE 802.11 standard may not be able to determine whether a 160 MHz (or less) PPDU bandwidth is assigned to a primary 160 MHz channel or a secondary 160 MHz channel. By signaling a PPDU bandwidth equal to 320 MHz but allocating only a portion of the 320 MHz bandwidth (within a secondary 160 MHz channel) for the transmission of a first PPDU, aspects of the present disclosure may signal that the first PPDU is transmitted within the secondary 160 MHz channel. As such, a second PPDU can be transmitted in a primary 160 MHz channel, concurrently with the first PPDU, using existing signaling techniques.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
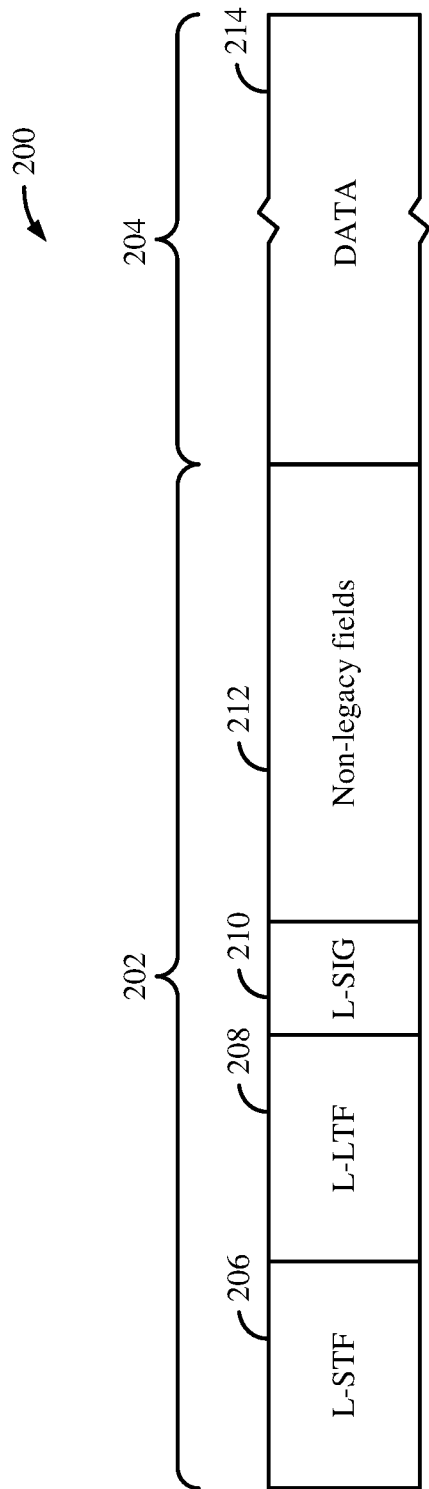
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
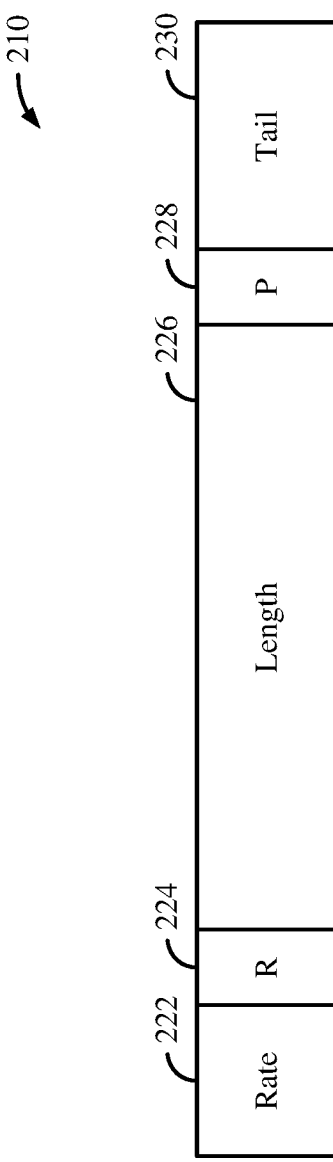
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

Figure 3:
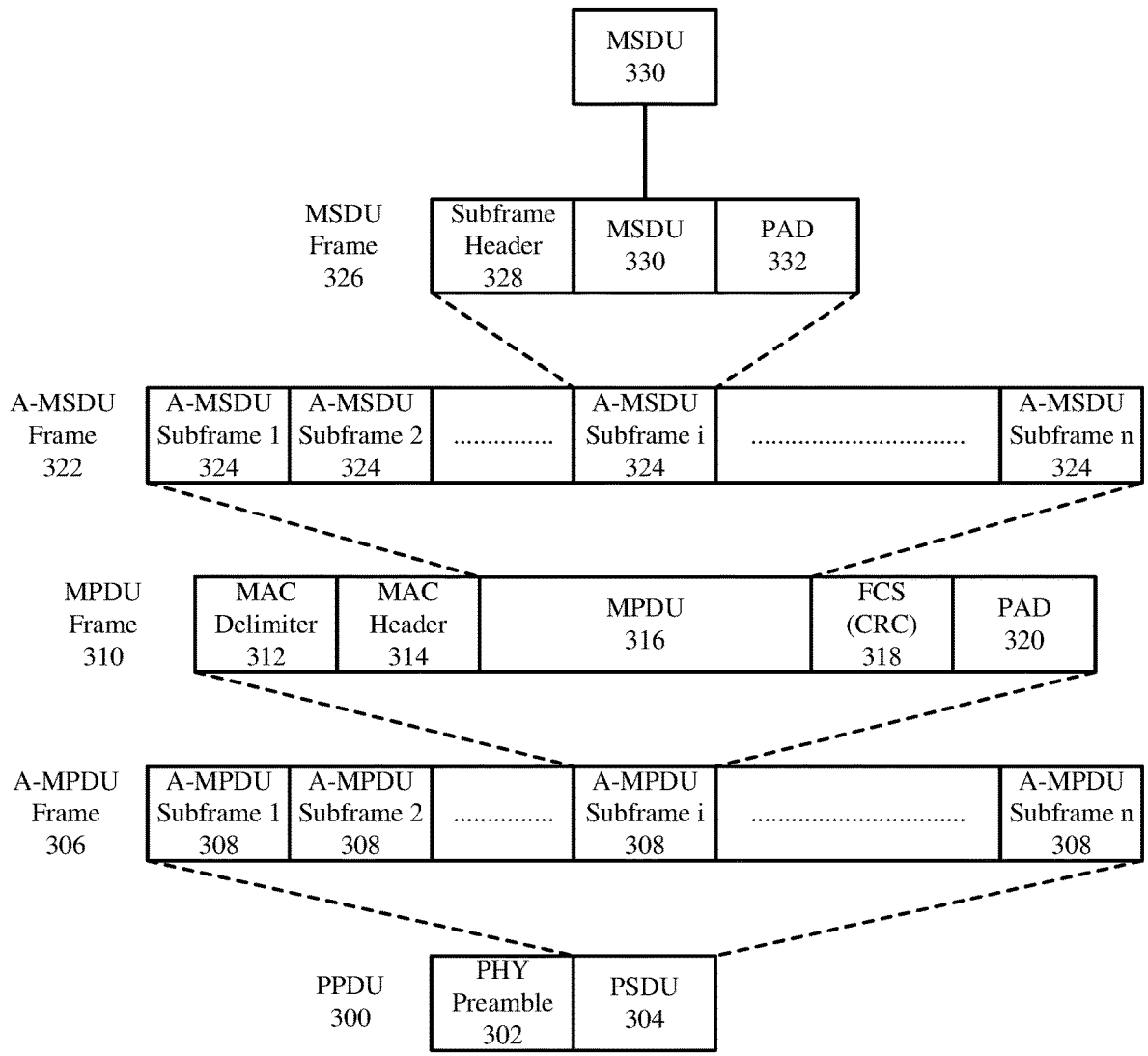
FIG. 3 shows an example physical layer convergence protocol (PLCP) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which comprises the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 326. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
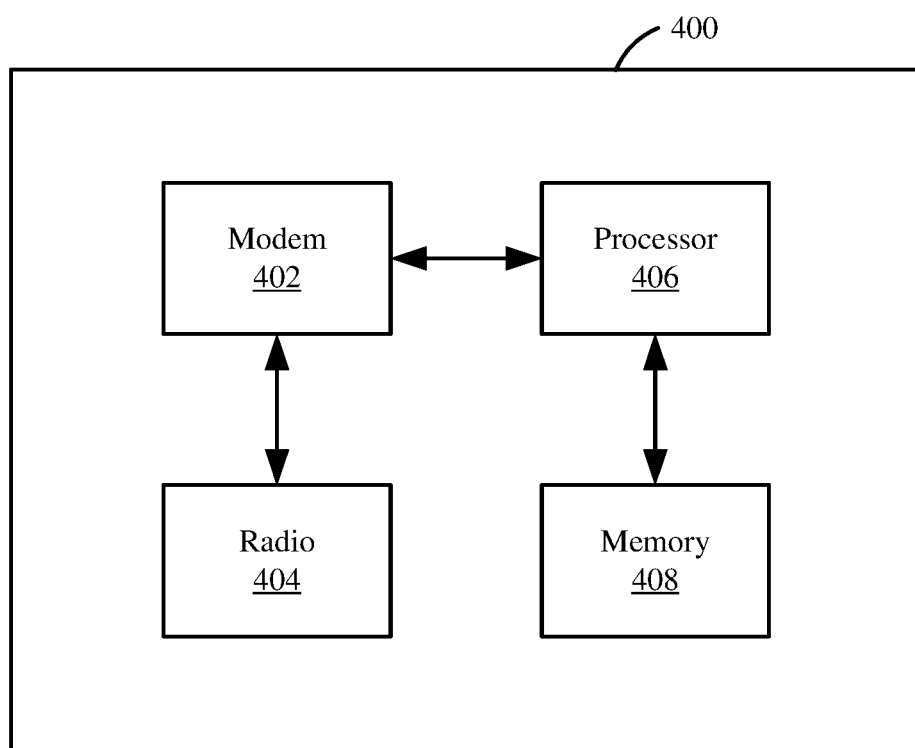
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
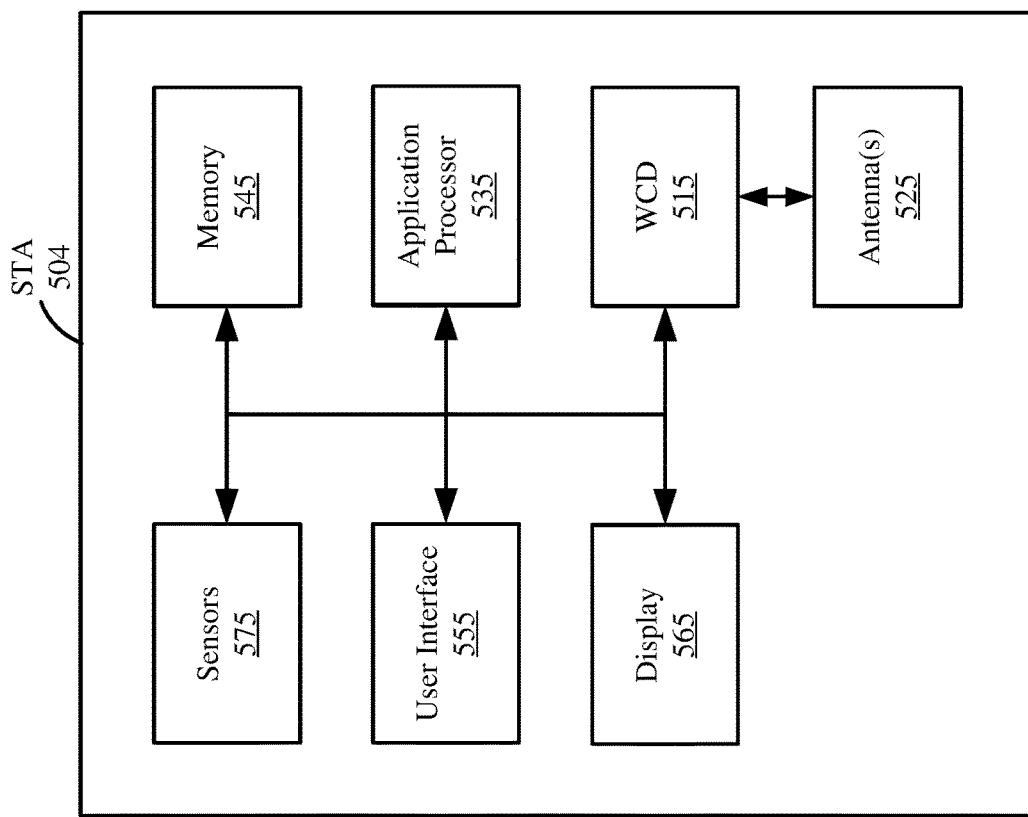
FIG. 5B shows a block diagram of an example STA.
Figure 5A:
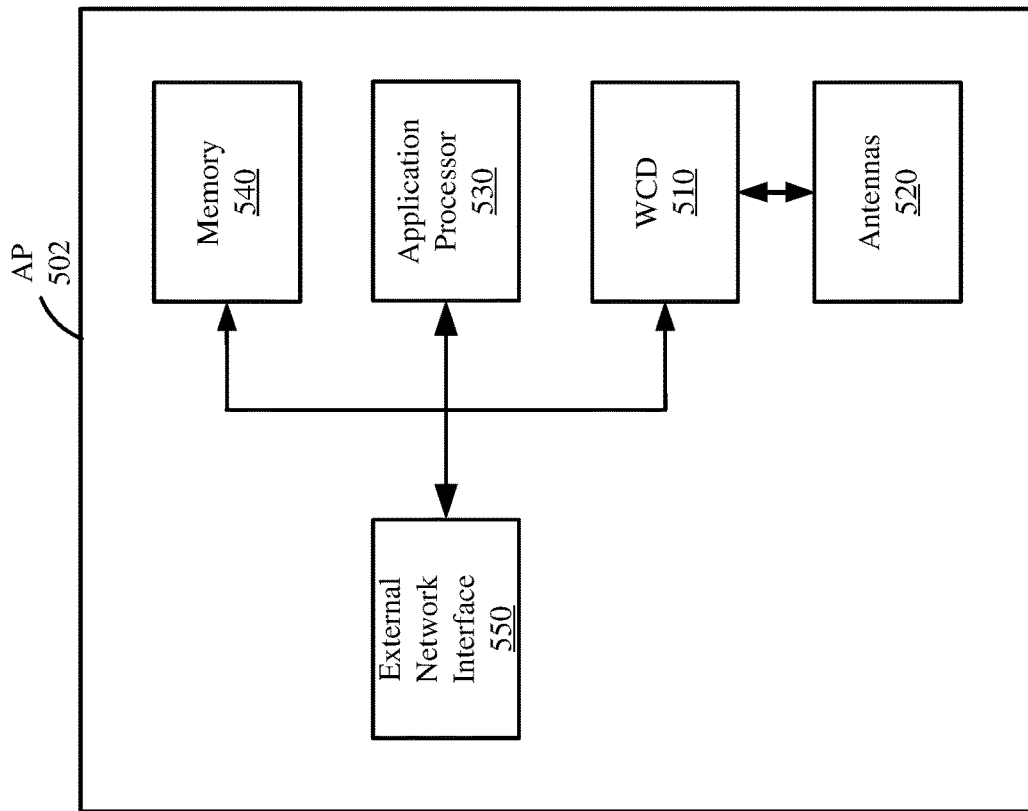
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

As described above, existing versions of the IEEE 802.11 standard support packet transmissions on bandwidths up to 160 MHz. New WLAN communication protocols are being developed to enable enhanced WLAN communication features such as, for example, increases in bandwidth up to 320 MHz and beyond. As a result, the 160 MHz bandwidth supported by existing versions of the IEEE 802.11 standard is referred to as a "primary 160 MHz channel" and the remaining 160 MHz bandwidth of a 320 MHz channel is referred to as a "secondary 160 MHz channel." As new WLAN communication protocols enable enhanced features, new packet designs are needed to support packet transmissions over greater bandwidths. In particular, new signaling techniques are needed to indicate whether a packet is transmitted in the primary 160 MHz channel or the secondary 160 MHz channel.

Various aspects relate generally to packet transmissions over a 320 MHz bandwidth, and more particularly, to signaling techniques for indicating the bandwidth of a PPDU transmitted in a secondary 160 MHz channel of the 320 MHz bandwidth. In some implementations, an AP may transmit an A-PPDU that includes a first sub-PPDU transmitted within a primary 160 MHz channel and a second sub-PPDU transmitted within a secondary 160 MHz channel. In some other implementations, an AP may solicit a TB PPDU including a first sub-PPDU to be transmitted within a primary 160 MHz channel and a second sub-PPDU to be transmitted within a secondary 160 MHz channel. In either implementation, the first sub-PPDU may carry bandwidth information indicating the bandwidth of the first sub-PPDU within the primary 160 MHz channel and the second sub-PPDU may carry bandwidth information indicating a 320 MHz bandwidth. In some implementations, the second sub-PPDU may carry punctured channel information or RU allocation information further limiting the bandwidth of the second sub-PPDU to only a portion of the 320 MHz bandwidth that falls within the secondary 160 MHz channel.

Particular implementations of the subject matter described in this disclosure can be implemented to realize one or more of the following potential advantages. By signaling the bandwidth of a PPDU within a secondary 160 MHz channel, aspects of the present disclosure may improve medium utilization for packets transmitted in accordance with new WLAN communication protocols. Specifically, such signaling techniques support the transmissions of multiple PPDUs, concurrently, in an A-PPDU. For example, when an A-PPDU is transmitted over a 320 MHz bandwidth, the bandwidth of each sub-PPDU of the A-PPDU must be less than or equal to 160 MHz. However, aspects of the present disclosure recognize that STAs operating in accordance with existing versions of the IEEE 802.11 standard may not be able to determine whether a 160 MHz (or less) PPDU bandwidth is assigned to a primary 160 MHz channel or a secondary 160 MHz channel. By indicating a PPDU bandwidth equal to 320 MHz but allocating only a portion of the 320 MHz bandwidth (within a secondary 160 MHz channel) for the transmission of a first PPDU, aspects of the present disclosure may signal that the first PPDU is transmitted within the secondary 160 MHz channel. As such, a second PPDU can be transmitted in a primary 160 MHz channel, concurrently with the first PPDU, using existing signaling techniques.

Figure 6A:
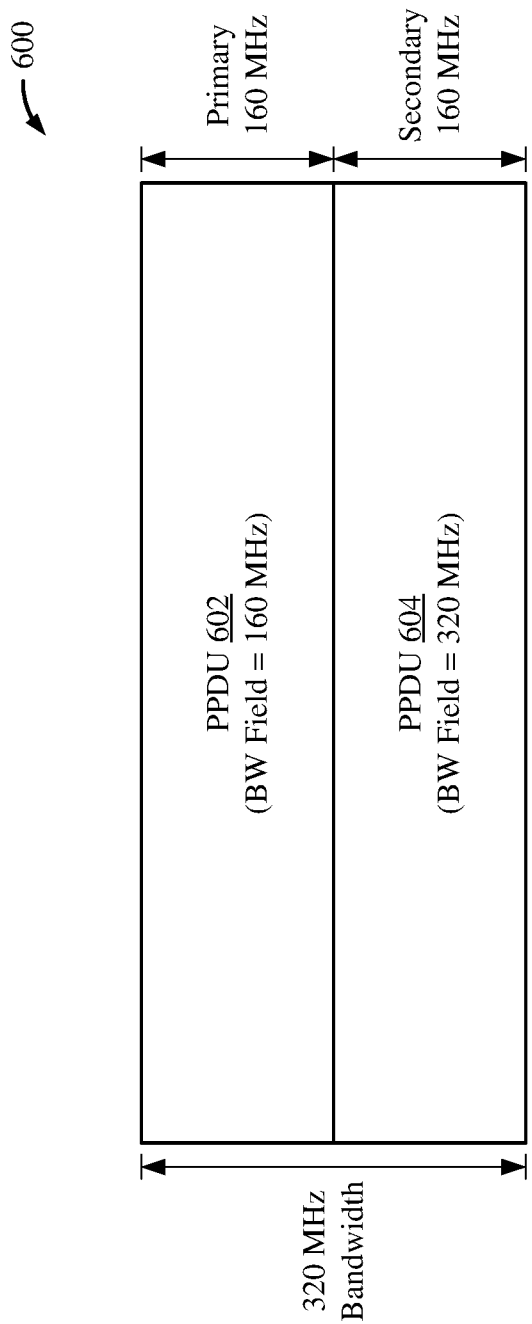
FIG. 6A shows an example aggregated PPDU (A-PPDU) usable for communications between an AP and a number of STAs according to some implementations.

FIG. 6A shows an example A-PPDU 600 usable for communications between an AP and a number of STAs according to some implementations. The A-PPDU 600 is an aggregate of multiple PPDUs that are transmitted concurrently on respective subchannels of a shared communications channel. In the example of FIG. 6A, the A-PPDU 600 is shown to include two PPDUs 602 and 604 that are transmitted on respective 160 MHz channels of a 320 MHz bandwidth. More specifically, the bandwidth of the first PPDU 602 spans a primary 160 MHz channel and the bandwidth of the second PPDU 604 spans a secondary 160 MHz channel. However, in actual implementations, the A-PPDU 600 may include any number of PPDUs that can be transmitted over a wide range of bandwidths.

Each of the PPDUs 602 and 604 includes a respective PHY preamble having a bandwidth (BW) field that carries bandwidth information indicating a bandwidth associated with the PPDU. In some implementations, the A-PPDU 600 may be a downlink or multi-user (MU) A-PPDU transmitted by an AP to two or more STAs. In such implementations, each STA that receives the first PPDU 602 decodes the PHY preamble transmitted on at least a portion of the primary 160 MHz channel to determine the bandwidth of the first PPDU 602. Similarly, each STA that receives the second PPDU 604 decodes the PHY preamble transmitted on at least a portion of the secondary 160 MHz channel to determine the bandwidth of the second PPDU 604.

In some other implementations, the A-PPDU 600 may be an uplink or trigger-based (TB) A-PPDU transmitted by two or more STAs responsive to a trigger frame transmitted by an AP. The trigger frame allocates resources for the transmission of the A-PPDU 600, for example, by signaling the bandwidths of the PPDU 602 and 604. In such implementations, each STA participating in the transmission of the first PPDU 602 decodes the bandwidth information in the trigger frame for the first PPDU 602 and copies the bandwidth information to bandwidth field in the PHY preamble of the first PPDU 602. Similarly, each STA participating in the transmission of the second PPDU 604 decodes the bandwidth information in the trigger frame for the second PPDU 604 and copies the bandwidth information to the bandwidth field in the PHY preamble of the second PPDU 604.

Aspects of the present disclosure recognize that STAs operating in accordance with existing versions of the IEEE 802.11 standard may only be able to identify the primary 160 MHz channel. For example, if the trigger frame indicates the bandwidth of the first PPDU 602 to be 160 MHz, the STAs participating in the transmission of the first PPDU 602 may transmit the PPDU 602 in the primary 160 MHz channel. However, if the trigger frame indicates the bandwidth of the second PPDU 604 to be 160 MHz, the STAs participating in the transmission of the second PPDU 604 also may transmit the second PPDU 604 in the primary 160 MHz channel. Thus, additional signaling is needed to differentiate PPDU bandwidths allocated within the primary 160 MHz channel from PPDU bandwidths allocated within the secondary 160 MHz channel.

In some aspects, the bandwidth assigned to any PPDU in the primary 160 MHz channel may be equal to the bandwidth on which the PPDU is transmitted in the primary 160

MHz, however, the bandwidth assigned to each PPDU in the secondary 160 MHz channel may be equal to 320 MHz. For example, the bandwidth field in the PHY preamble of the first PPDU 602 may indicate a bandwidth equal to 160 MHz. In contrast, the bandwidth field in the PHY preamble of the second PPDU 604 may indicate a bandwidth equal to 320 MHz. In some implementations, the PHY preamble of the second PPDU 604 may further carry a secondary 160 MHz indication to signal that the second PPDU 604 is transmitted only within the secondary 160 MHz channel of the 320 MHz bandwidth. If the A-PPDU 600 is a TB A-PPDU, the trigger frame soliciting the A-PPDU 600 may assign a 160 MHz bandwidth to the first PPDU 602 and a 320 MHz bandwidth to the second PPDU 604.

In some implementations, the first PPDU 602 may be a legacy PPDU and the second PPDU 604 may be a non-legacy PPDU. As used herein, the term "legacy" refers to PPDU formats and communication protocols conforming to the IEEE 802.11ax amendment of the IEEE 802.11 standard. In contrast, the term "non-legacy" refers to PPDU formats and communication protocols conforming to the IEEE 802.11be amendment, and future generations, of the IEEE 802.11 standard. As described above, legacy PPDUs can only be transmitted within the primary 160 MHz channel. However, the PPDU bandwidth allocation within the primary 160 MHz channel may vary. For example, a PPDU assigned to the primary 160 MHz channel may be transmitted on any portion (or bandwidth segment) of the primary 160 MHz channel.

Aspects of the present disclosure further recognize that some STAs operating in accordance with existing versions of the IEEE 802.11 standard may combine the PHY preamble of a legacy PPDU across the entire 160 MHz bandwidth of the primary 160 MHz channel. As such, the transmission of a non-legacy PPDU may not extend into the primary 160 MHz channel of an A-PPDU that includes a legacy PPDU. However, the PPDU bandwidth allocation within the secondary 160 MHz channel may vary. For example, a PPDU assigned to the secondary 160 MHz channel may be transmitted on any portion (or bandwidth segment) of the secondary 160 MHz channel.

Figure 6B:
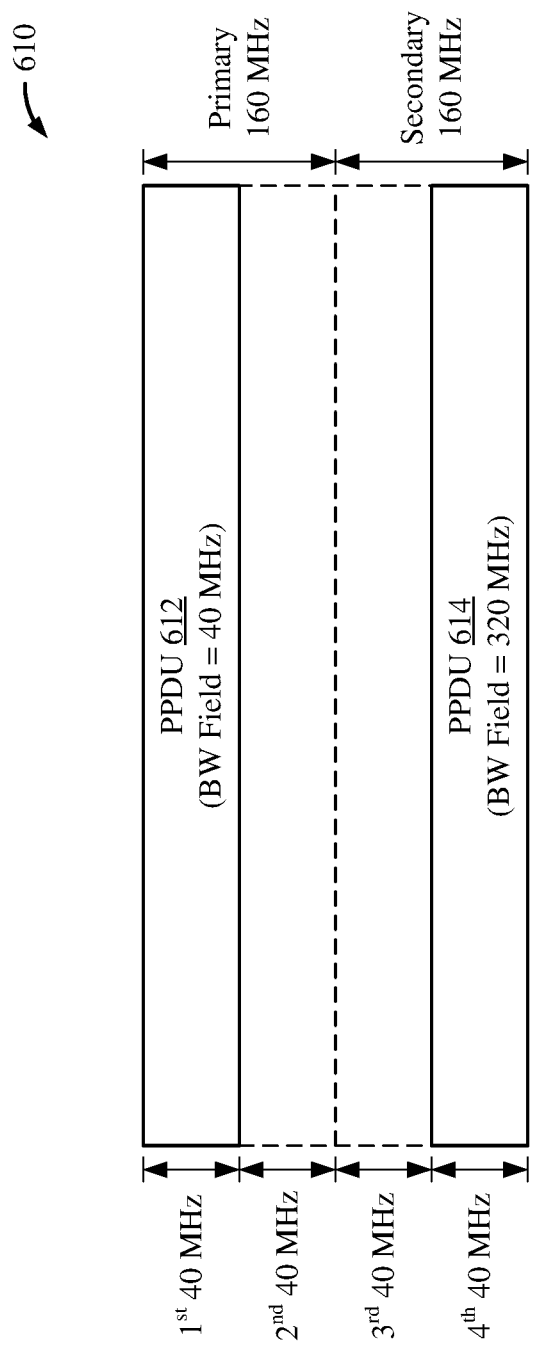
FIG. 6B shows another example A-PPDU usable for communications between an AP and a number of STAs according to some implementations.

FIG. 6B shows another example A-PPDU 610 usable for communications between an AP and a number of STAs according to some implementations. In some implementations, the A-PPDU 610 may be a downlink or MU A-PPDU transmitted by an AP to two or more STAs. In some other implementations, the A-PPDU 610 may be an uplink or TB A-PPDU transmitted by two or more STAs responsive to a trigger frame transmitted by an AP. In the example of FIG. 6B, the A-PPDU 610 is shown to include two PPDUs 612 and 614 that are transmitted on the $1^{st}$ and $4^{th}$ 40 MHz channels, respectively, of a 320 MHz bandwidth. More specifically, the bandwidth of the first PPDU 612 is allocated within a primary 160 MHz channel and the bandwidth of the second PPDU 614 is allocated within a secondary 160 MHz channel. However, in actual implementations, the A-PPDU 610 may include any number of PPDUs that can be transmitted over a wide range of bandwidths.

As shown in FIG. 6B, the bandwidth field in the PHY preamble of the first PPDU 612 may indicate a bandwidth equal to 40 MHz. In contrast, the bandwidth field in the PHY preamble of the second PPDU 614 may indicate a bandwidth equal to 320 MHz. In some aspects, the PHY preamble of the second PPDU 614 may further carry a secondary 160 MHz indication to signal that the second PPDU 614 is transmitted only within the secondary 160 MHz channel of the 320 MHz bandwidth. In some implementations, the secondary 160 MHz indication may include resource unit (RU) allocation information indicating that the data portion of the second PPDU 614 (and EHT modulated portion of the PHY preamble) is transmitted on a 484-tone RU coinciding with the $4^{th}$ 40 MHz channel of the 320 MHz bandwidth. In some other implementations, the secondary 160 MHz indication may include punctured channel information indicating that the $1^{st}$, $2^{nd}$, and $3^{rd}$ 40 MHz channels of the 320 MHz bandwidth are punctured.

Figure 7:
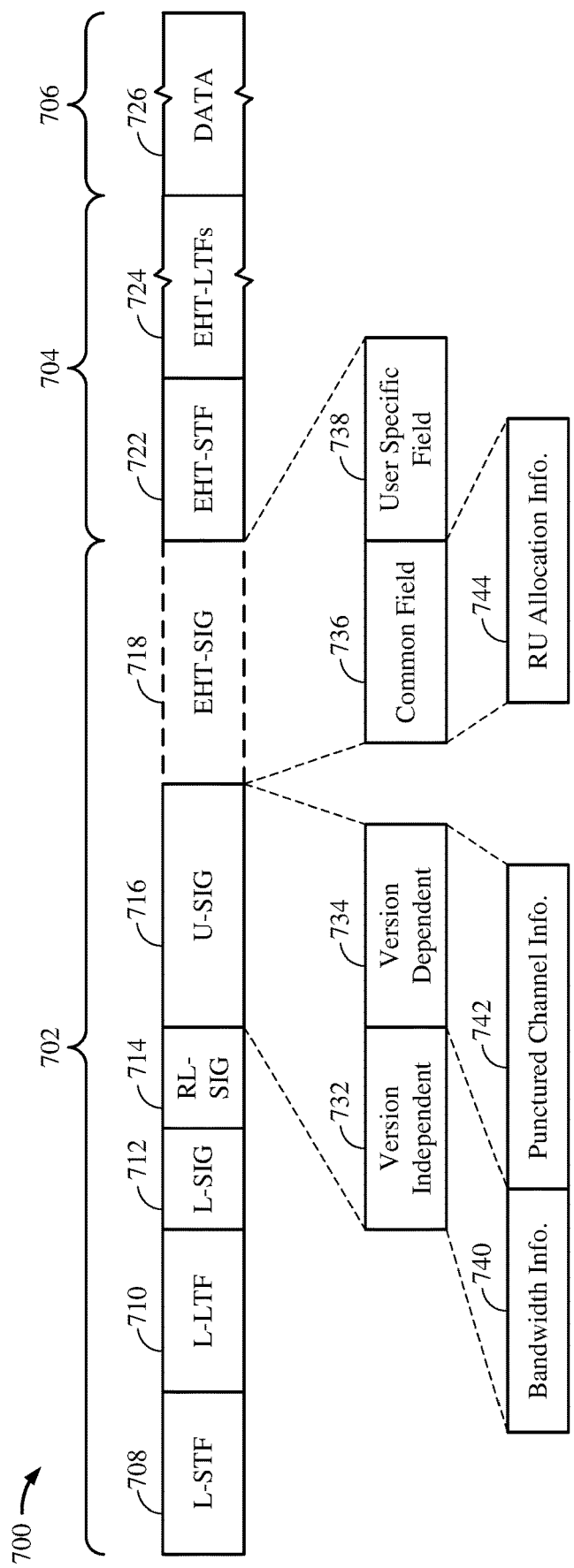
FIG. 7 shows an example frame structure of a PPDU usable for communications between an AP and a number of STAs according to some implementations.

FIG. 7 shows an example frame structure of a PPDU 700 usable for communications between an AP and a number of STAs according to some implementations. The PPDU 700 includes a PHY preamble including a first portion 702 (also referred to as a "pre-EHT modulated" portion) and a second portion 704 (also referred to as an "EHT modulated" portion). The PPDU 700 may further include a PHY payload 706 after the preamble, for example, in the form of a PSDU carrying a data field 726. In some implementations, the PPDU 700 may be formatted as a non-legacy or Extremely High Throughput (EHT) PPDU.

The first portion 702 of the PHY preamble includes L-STF 708, L-LTF 710, and L-SIG 712, a repeated legacy signal field (RL-SIG) 714, and a universal signal field (U-SIG) 716. The second portion 704 of the PHY preamble includes a non-legacy short training field (EHT-STF) 722, and a number of non-legacy long training fields (EHT-LTFs) 724. In some implementations, the first portion 702 may further include a non-legacy signal field (EHT-SIG) 718. In the IEEE 802.11be amendment, and future generations of the IEEE 802.11 standard, new fields may be used to carry signaling information. For example, at least some of the new fields and signaling information may be included in U-SIG 716. Additionally, new fields and signaling information may be included in EHT-SIG 718.

U-SIG 716 may include signaling regarding types or formats of additional signal fields that may follow U-SIG 716. Such signaling may be carried in one or more version-independent fields 732 and one or more version-dependent fields 734. The version-independent fields 732 may include, for example, a PPDU bandwidth subfield carrying bandwidth information 740 indicating a bandwidth associated with the PPDU 700 (such as from 20 MHz to 320 MHz). The version-dependent fields 734 may carry information used for interpreting other fields of U-SIG 716 or EHT-SIG 718. Example version-dependent fields 734 may include a punctured channel subfield carrying punctured channel information 742 indicating one or more punctured channels associated with the bandwidth information 740. The punctured channels represent one or more channels, within the bandwidth indicated by the bandwidth information 740, on which the PPDU 700 is not transmitted.

EHT-SIG 718 may include a common field 736 and a user specific field 738. The user specific field 738 may include a number of user fields carrying per-user information for intended recipients of the PPDU 700. In contrast, the common field 736 may carry information that is common to all users associated with the PPDU 700. The common field 736 may include, for example, an RU allocation subfield carrying RU allocation information 744 indicating one or more RUs allocated for the users associated with the PPDU 700. The contents and availability of EHT-SIG 718 may depend on the format of the PPDU 700. For example, EHT-SIG 718 is absent or omitted in the EHT TB PPDU. Although EHT-SIG 718 is present in the EHT MU PPDU format, the RU allocation information 744 may be present only when the PPDU 700 is configured for DL OFDMA transmission. In other words, the RU allocation information 744 may be absent or omitted when the PPDU 700 is configured for DL MU-MIMO (non-OFDMA) transmission or for transmission to a single user.

In some implementations, the PPDU 700 may be configured for transmission in the secondary 160 MHz channel of a 320 MHz bandwidth. With reference for example to FIGS. 6A and 6B, the PPDU 700 may be one example of any of the PPDUs 604 or 614. In such implementations, the bandwidth information 740 in U-SIG 716 may be configured to indicate a 320 MHz bandwidth. In some aspects, the PHY preamble of the PPDU 700 may further carry a secondary 160 MHz indication to signal that the PPDU 700 is transmitted only within the secondary 160 MHz channel of the 320 MHz bandwidth. In some implementations, the secondary 160 MHz indication may be provided, at least in part, by the RU allocation information 744 in the common field 736 of EHT-SIG 718. For example, the RU allocation information 744 may allocate one or more RUs for the transmission of the PPDU 700 within the secondary 160 MHz channel.

In some other implementations, the secondary 160 MHz indication may be provided, at least in part, by the punctured channel information 742 in U-SIG 716. For example, the punctured channel information 742 may indicate that the primary 160 MHz channel of the 320 MHz bandwidth is punctured. In some implementations, the punctured channel information 742 may indicate a punctured channel greater than 160 MHz (such as when the PPDU 700 is transmitted on only a portion of the secondary 160 MHz channel). However, aspects of the present disclosure recognize that existing versions of the IEEE 802.11 standard currently do not support channel puncturing patterns that would reduce the physical bandwidth of the PPDU 700 to less than 200 MHz of a 320 MHz bandwidth. In other words, the existing channel puncturing patterns support puncturing, at most, 120 MHz of a 320 MHz bandwidth.

Aspects of the present disclosure further recognize that U-SIG 716 may include a number of reserved bits. Reserved bits represent unused bits that are reserved for future implementations of the IEEE 802.11 standard. In some aspects, one or more reserved bits in an earlier version or release of the IEEE 802.11 standard may be repurposed (to carry information) in a later version or release. For example, one or more reserved bits in the U-SIG 716 may be repurposed, in later versions or releases of the IEEE 802.11 standard, to expand a range of values that can be represented by existing fields in an earlier version or release. In some implementations, one or more of the reserved bits in U-SIG 716 may be repurposed to expand the number of channel puncturing patterns that can be represented by the punctured channel information 742. Specifically, the punctured channel information 742 may be expanded to support punctured bandwidths greater than or equal to 160 MHz.

Figure 8:
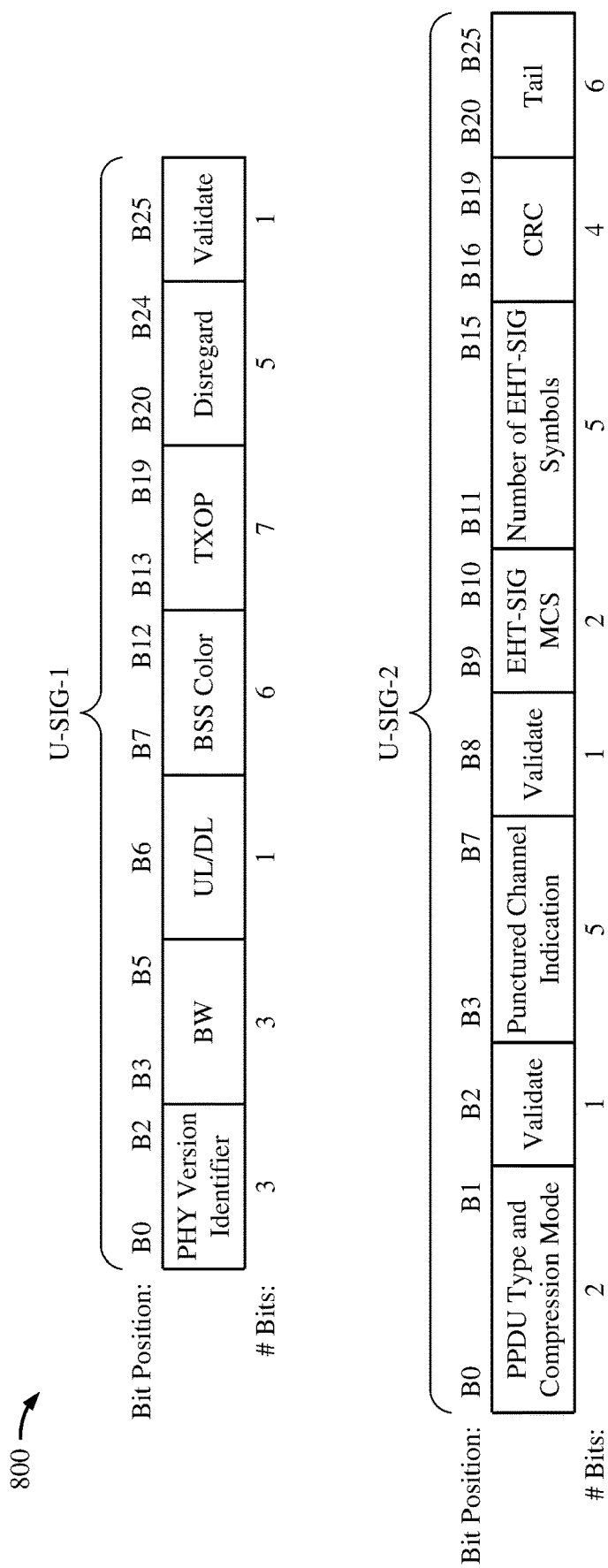
FIG. 8 shows a universal signal field (U-SIG) for a PPDU formatted in accordance with an existing multi-user (MU) PPDU format.

FIG. 8 shows a U-SIG 800 for a PPDU formatted in accordance with an existing MU PPDU format. More specifically, U-SIG 800 conforms to the U-SIG format for an EHT MU PPDU defined by an initial release of the IEEE 802.11be amendment of the IEEE 802.11 standard. With reference for example to FIG. 7, U-SIG 800 may be one example of U-SIG 716. The subfields of U-SIG 800 are distributed across two U-SIG symbols (U-SIG-1 and U-SIG-2). As shown in FIG. 8, U-SIG 800 includes a 3-bit bandwidth field (in bit positions B3-B5 of U-SIG-1) and a 5-bit punctured channel indication field (in bit positions B3-B7 of U-SIG-2). In some implementations, the bandwidth field may carry the bandwidth information 740 and the punctured channel indication field may carry the punctured channel information 742 of FIG. 7.

U-SIG 800 also includes a number of reserved bits. According to the EHT MU PPDU format, reserved bits in U-SIG 800 are further classified as validate bits or disregard bits. The validate bits are used to indicate whether a STA should continue receiving the PPDU whereas the disregard bits may be ignored by the receiving STA. As shown in FIG. 8, U-SIG 800 includes 3 validate bits and 5 disregard bits distributed across two U-SIG symbols (U-SIG-1 and U-SIG-2). More specifically, U-SIG 1500 includes 5 disregard bits in U-SIG-1 (in bit positions B20-B24), 1 validate bit in U-SIG-1 (in bit positions B25), and 2 validate bits in U-SIG-2 (in bit positions B2 and B8). In some aspects, at least one of the validate may be repurposed to expand the punctured channel indication field. In some other aspects, at least one of the disregard bits may be repurposed to expand the number of channel puncturing patterns that can be represented by the punctured channel indication field.

In some implementations, 18 new entries may be added to the existing punctured channel table by expanding the punctured channel indication field from 5 bits to 6 bits. The 18 new entries represent channel puncturing patterns associated with the secondary 160 MHz channel. More specifically, 5 new entries can be used to indicate the channel puncturing pattern when the PPDU is transmitted within an 80 MHz portion of the secondary 160 MHz channel (referred to herein as the "current 80 MHz") and 13 new entries can be used to indicate the channel puncturing pattern when the PPDU is transmitted on a portion of the secondary 160 MHz channel larger than 80 MHz (referred to herein as the "current 160 MHz"). All remaining subchannels outside of the current 80 MHz or the current 160 MHz are assumed to be punctured. Table 1 shows an example extension to the punctured channel table suitable for signaling the bandwidth of a PPDU within the secondary 160 MHz channel.

TABLE 1

| PPDU Bandwidth | Cases | Puncturing Pattern |
| --- | --- | --- |
| Current 80 MHz | No Puncturing | [1 1 1 1] |
| | 20 MHz Puncturing | [x 1 1 1] |
| | | [1 x 1 1] |
| | | [1 1 x 1] |
| | | [1 1 1 x] |
| Current 160 MHz | No Puncturing | [1 1 1 1 1 1 1 1] |
| | 20 MHz Puncturing | [x 1 1 1 1 1 1 1] |
| | | [1 x 1 1 1 1 1 1] |
| | | [1 1 x 1 1 1 1 1] |
| | | [1 1 1 x 1 1 1 1] |
| | | [1 1 1 1 x 1 1 1] |
| | | [1 1 1 1 1 x 1 1] |
| | | [1 1 1 1 1 1 x 1] |
| | | [1 1 1 1 1 1 1 x] |
| | 40 MHz Puncturing | [x x 1 1 1 1 1 1] |
| | | [1 1 x x 1 1 1 1] |
| | | [1 1 1 1 x x 1 1] |
| | | [1 1 1 1 1 1 x x] |

In Table 1, an "x" represents a punctured 20 MHz subchannel. For example, the channel puncturing pattern [x 1 1 1] indicates that the $1^{st}$ 20 MHz subchannel of the current 80 MHz bandwidth (on which the PPDU is transmitted) is punctured. In addition, all remaining subchannels outside of the current 80 MHz bandwidth are also punctured. This includes all remaining subchannels of the secondary 160 MHz channel and all subchannels of the primary 160 MHz channel. As such, the PPDU is indicated to be transmitted on a 60 MHz portion of the secondary 160 MHz channel (which includes the $2^{nd}$, $3^{rd}$, and $4^{th}$ 20 MHz subchannels of the current 80 MHz bandwidth).

In some other implementations, the 5-bit value of the punctured channel indication field may be reinterpreted based on the value of a disregard or validate bit. For example, when the value of the disregard or validate bit is flipped (such as from "1" to "0"), the value of the punctured channel indication field may map to an entry in an alternate punctured channel table. More specifically, the alternate punctured channel table may include 19 entries each indicating a different channel puncturing pattern associated with the secondary 160 MHz channel. Because the alternate punctured channel table is associated with the secondary 160 MHz channel, all subchannels of the primary 160 MHz channel are assumed to be punctured. Table 2 shows an example alternate punctured channel table suitable for signaling the bandwidth of a PPDU within the secondary 160 MHz channel.

TABLE 2

| PPDU Bandwidth | Cases | Puncturing Pattern |
|---|---|---|
| 320 MHz | No Puncturing | [1 1 1 1 1 1 1 1] |
| | 20 MHz Puncturing in S160 | [x 1 1 1 1 1 1 1] |
| | | [1 x 1 1 1 1 1 1] |
| | | [1 1 x 1 1 1 1 1] |
| | | [1 1 1 x 1 1 1 1] |
| | | [1 1 1 1 x 1 1 1] |
| | | [1 1 1 1 1 x 1 1] |
| | | [1 1 1 1 1 1 x 1] |
| | | [1 1 1 1 1 1 1 x] |
| | 40 MHz Puncturing in S160 | [x x 1 1 1 1 1 1] |
| | | [1 1 x x 1 1 1 1] |
| | | [1 1 1 1 x x 1 1] |
| | | [1 1 1 1 1 1 x x] |
| | 80 MHz Puncturing in S160 | [x x x x 1 1 1 1] |
| | | [1 1 1 1 x x x x] |
| | 80 MHz and 40 MHz Puncturing in S160 | [x x x x x x 1 1] |
| | | [x x x x 1 1 x x] |
| | | [x x 1 1 x x x x] |
| | | [1 1 x x x x x x] |

In Table 2, an "x" represents a punctured 20 MHz subchannel. For example, the channel puncturing pattern [x 1 1 1 1 1 1 1] indicates that the $1^{st}$ 20 MHz subchannel of the secondary 160 MHz channel is punctured. In addition, all subchannels of the primary 160 MHz channel are also punctured. As such, the PPDU is indicated to be transmitted on a 140 MHz portion of the secondary 160 MHz channel (which includes the $2^{nd}$-$8^{th}$ 20 MHz subchannels of the secondary 160 MHz channel).

Figure 9:
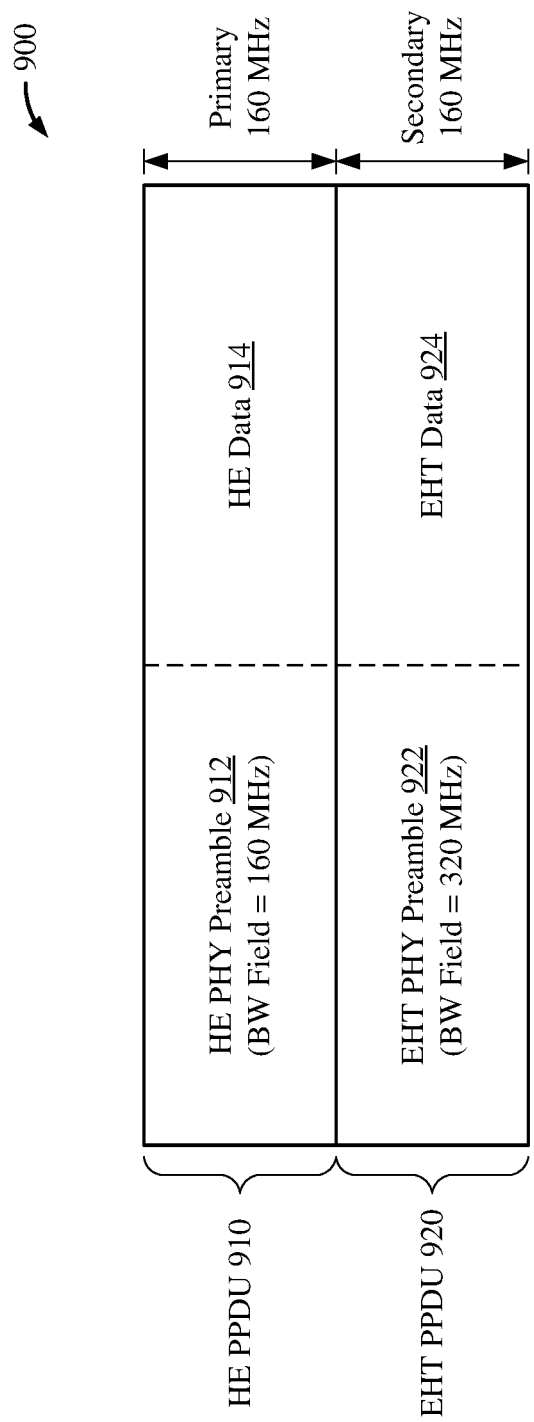
FIG. 9 shows another example A-PPDU usable for communications between an AP and a number of STAs according to some implementations.

FIG. 9 shows another example A-PPDU 900 usable for communications between an AP and a number of STAs according to some implementations. In some implementations, the A-PPDU 900 may be a downlink or MU A-PPDU transmitted by an AP to two or more STAs. In some other implementations, the A-PPDU 900 may be an uplink or TB A-PPDU transmitted by two or more STAs responsive to a trigger frame transmitted by an AP. In the example of FIG. 9, the A-PPDU 900 is shown to include two PPDUs 910 and 920 that are transmitted on respective 160 MHz channels of a 320 MHz bandwidth. More specifically, the bandwidth of the first PPDU 910 spans a primary 160 MHz channel and the bandwidth of the second PPDU 920 spans a secondary 160 MHz channel. However, in actual implementations, the A-PPDU 900 may include any number of PPDUs that can be transmitted over a wide range of bandwidths.

In some implementations, the A-PPDU 900 may be one example of the A-PPDU 600 of FIG. 6A. More specifically, the PPDUs 910 and 920 conform with different PPDU formats. In the example of FIG. 9, the first PPDU 910 is a legacy PPDU that conforms with a High Efficiency (HE) PPDU format such as defined by the IEEE 802.11ax amendment to the IEEE 802.11 standard, whereas the second PPDU 920 is a non-legacy PPDU that conforms with an EHT PPDU format such as defined by the IEEE 802.11be amendment. Accordingly, the HE PPDU 910 includes an HE PHY preamble 912 followed by an HE data portion 914, and the EHT PPDU 920 includes an EHT PHY preamble 922 followed by an EHT data portion 924. In some implementations, the bandwidth field of the HE PHY preamble 912 may indicate a bandwidth equal to 160 MHz and the bandwidth field of the EHT PHY preamble 922 may indicate a bandwidth equal to 320 MHz.

Because the PPDUs 910 and 920 are transmitted concurrently as a single A-PPDU 900, the information signaled in the HE PHY preamble 912 must not conflict with the information signaled in the EHT PHY preamble 922. For example, spatial reuse is a technique that allows STAs in an overlapping BSS (OBSS) to communicate over a shared wireless medium that may otherwise be sensed as busy due to interference from the current BSS. When spatial reuse is permitted, a STA in the OBSS may increase its received signal strength indication (RSSI) threshold for detecting busy channel conditions on the shared wireless medium. As such, the requirements for channel access are relaxed when interfering transmissions are associated with an OBSS. Because spatial reuse is supported by the IEEE 802.11ax amendment and beyond, the spatial reuse values signaled by the EHT PHY preamble 922 must be consistent with the spatial reuse values signaled by the HE PHY preamble 912.

Aspects of the present disclosure recognize that the HE PHY preamble 912 includes a single 4-bit spatial reuse field (in HE-SIG-A) for all PPDU formats used in downlink transmissions, and that the EHT PHY preamble 922 also includes a single 4-bit spatial reuse field (in the common field of EHT-SIG) for all configurations of the EHT MU PPDU format used in downlink transmissions. Thus, in some implementations in which the A-PPDU 900 is a downlink or MU A-PPDU, an AP may set the spatial reuse fields in the HE PHY preamble 912 and the EHT PHY preamble 922 to the same value. Example spatial reuse values include a parameterized spatial reuse (PSR) threshold value, PSR_DISALLOW (which prohibits PSR-based spatial reuse during transmission of the A-PPDU 900), and PSR_AND_NON_SRG_OBSS_PD_PROHIBITED (which prohibits both PSR-based spatial reuse and non-spatial reuse group (non-SRG) OBSS packet detection (PD)-based spatial reuse during transmission of the A-PPDU 900).

Figures 10A, 10B:
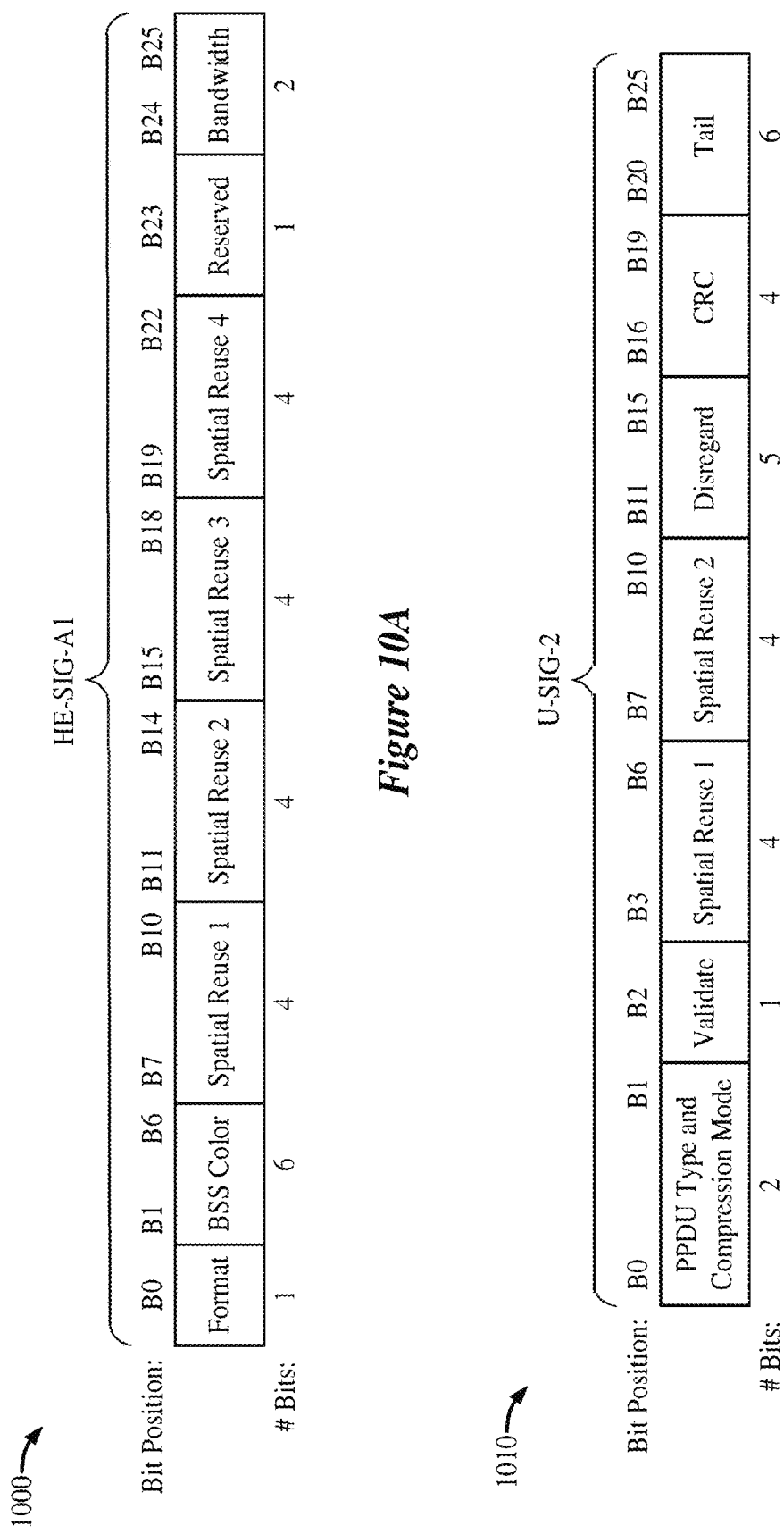
FIG. 10A shows a High Efficiency (HE) signal field (HE-SIG-A) for a PPDU formatted in accordance with an existing TB PPDU format.
FIG. 10B shows a U-SIG for a PPDU formatted in accordance with an existing trigger-based (TB) PPDU format.

Aspects of the present disclosure further recognize that the HE PHY preamble 912 includes four 4-bit spatial reuse fields (in an HE-SIG-A field) for the HE TB PPDU format used in uplink transmissions, whereas the EHT PHY preamble 922 includes only two 4-bit spatial reuse fields (in U-SIG) for the EHT TB PPDU format used in uplink transmissions. FIG. 10A shows an HE signal A field (HE-SIG-A) 1000 for a PPDU formatted in accordance with an existing TB PPDU format. For simplicity, only the first symbol of HE-SIG-A (HE-SIG-A1) is depicted in FIG. 10A. As shown in FIG. 10A, HE-SIG-A 1000 includes four 4-bit spatial reuse fields (in bit positions B7-B10, B11-B14, B15-B18, and B19-B22). The spatial reuse fields 1-4 of HE-SIG-A 1000 may be subsequently referred to as HSR1-HSR4, respectively. FIG. 10B shows a U-SIG 1010 for a PPDU formatted in accordance with an existing TB PPDU format. For simplicity, only the second symbol of U-SIG (U-SIG-2) is depicted in FIG. 10B. As shown in FIG. 10B, U-SIG 1010 includes two 4-bit spatial reuse fields (in bit positions B3B6 and B7-B10). The spatial reuse fields 1 and 2 of U-SIG 1010 may be referred to as ESR_p and ESR_s, respectively.

In the HE PHY preamble 912, each of the spatial reuse fields HSR1-HSR4 represents a respective 40 MHz subchannel of the primary 160 MHz channel. In the EHT PHY preamble 922, the first spatial reuse field ESR_p represents the primary 160 MHz channel while the second spatial reuse field ESR_s represents the secondary 160 MHz channel. As such, the value of ESR_s may be independent of (or unaffected by) the values of HSR1-HSR4. However, the value of ESR_p must be consistent with the values of HSR1, HSR2, HSR3, and HSR4. In some implementations, an AP may first determine a value of ESR_p based on the entirety of the primary 160 MHz channel, and may set the values of HSR1-HSR4 equal to the value of ESR_p (HSR1=HSR2=HSR3=HSR4=ESR_p). The AP may further signal the values of HSR1-HSR4, ESR_p, and ESR_s (to be included in the A-PPDU 900) in a trigger frame used to solicit the A-PPDU 900.

In some other implementations, an AP may first determine the values of HSR1-HSR4 based on each 40 MHz subchannel of the primary 160 MHz channel, and may determine the value of ESR_p based on the values of HSR1-HSR4. Specifically, the AP may determine the value of ESR_p in a conservative manner. For example, if at least one of HSR1, HSR2, HSR3, or HSR4 is set to PSR_AND_NON_SR-G_OBSS_PD_PROHIBITED, the AP may also set ESR_p to PSR_AND_NON_SRG_OBSS_PD_PROHIBITED. If neither HSR1, HSR2, HSR3, nor HSR4 is set to PSR_AND_NON_SRG_OBSS_PD_PROHIBITED, but at least one of HSR1, HSR2, HSR3, or HSR4 is set to PSR_DISALLOW, the AP may also set ESR_p to PSR_DISALLOW. Otherwise, if none of the spatial reuse fields HSR1-HSR4 is set to PSR_AND_NON_SRG_OBSS_PD_PROHIBITED or PSR_DISALLOW, the AP may set ESR_p to the minimum PSR threshold value indicated by any of HSR1, HSR2, HSR3, or HSR4 (ESR_p=min(HSR1, HSR2, HSR3, HSR4)). The AP may further signal the values of HSR1-HSR4, ESR_p, and ESR_s (to be included in the A-PPDU 900) in a trigger frame used to solicit the A-PPDU 900.

Figure 11:
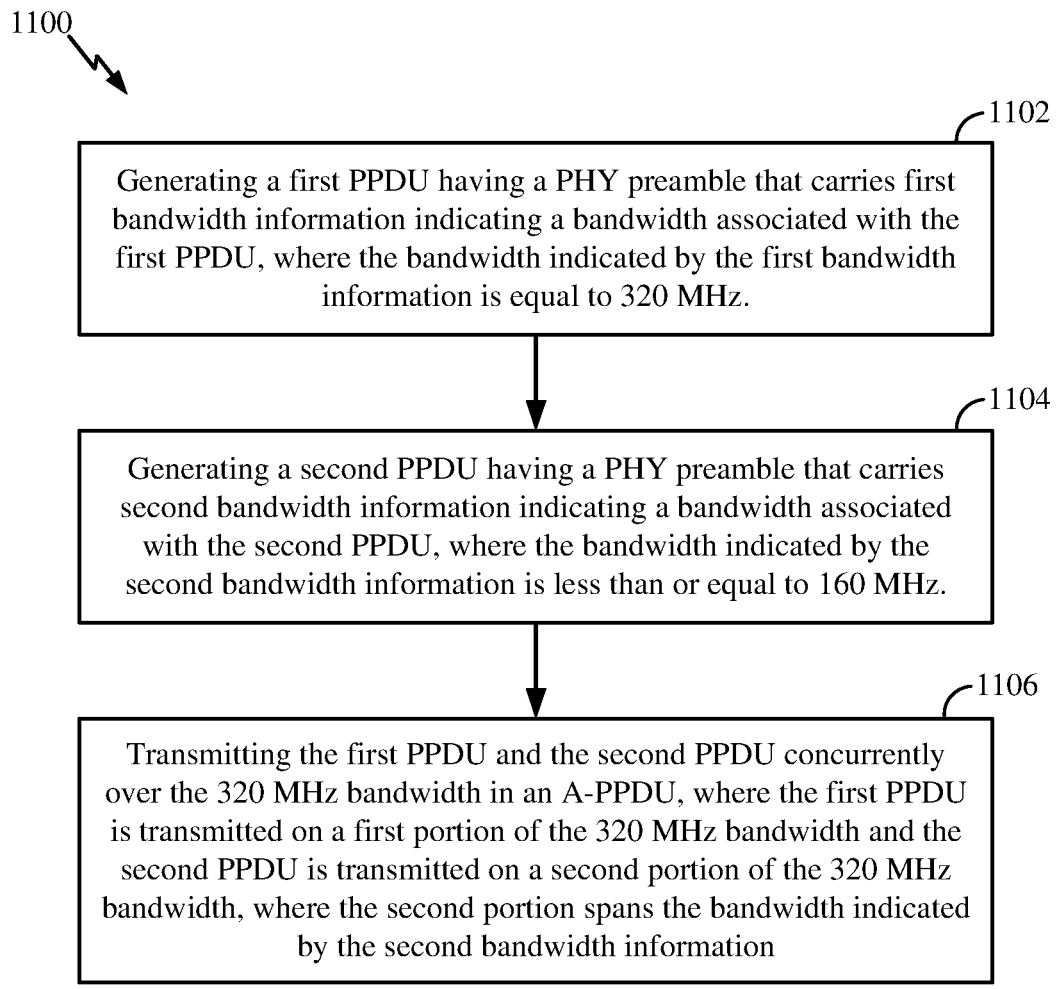
FIG. 11 shows a flowchart illustrating an example process for wireless communication that supports bandwidth indications for a secondary 160 MHz channel according to some implementations.

FIG. 11 shows a flowchart illustrating an example process 1100 for wireless communication that supports bandwidth indication for a secondary 160 MHz channel according to some implementations. In some implementations, the process 1100 may be performed by a wireless communication device operating as or within an AP, such as one of the APs 102 or 502 described above with reference to FIGS. 1 and 5A, respectively.

In some implementations, the process 1100 begins in block 1102 with generating a first PPDU having a PHY preamble that carries first bandwidth information indicating a bandwidth associated with the first PPDU, where the bandwidth indicated by the first bandwidth information is equal to 320 MHz. In block 1104, the process 1100 proceeds with generating a second PPDU having a PHY preamble that carries second bandwidth information indicating a bandwidth associated with the second PPDU, where the bandwidth indicated by the second bandwidth information is less than or equal to 160 MHz. In block 1106, the process 1100 proceeds with transmitting the first PPDU and the second PPDU concurrently over the 320 MHz bandwidth in an A-PPDU, where the first PPDU is transmitted on a first portion of the 320 MHz bandwidth and the second PPDU is transmitted on a second portion of the 320 MHz bandwidth, where the second portion spans the bandwidth indicated by the second bandwidth information.

In some aspects, the second portion may be located within a primary 160 MHz sub-band of the 320 MHz bandwidth and the second portion may be located within a secondary 160 MHz sub-band of the 320 MHz bandwidth. In some implementations, the PHY preamble of the first PPDU may further carry resource unit (RU) allocation information indicating one or more RUs or multiple RUs (MRUs) allocated for one or more respective users associated with the first PPDU, where each of the one or more RUs or MRUs is allocated within the first portion of the 320 MHz bandwidth.

In some other implementations, the PHY preamble of the first PPDU may further carry punctured channel information indicating one or more punctured channels representing a punctured bandwidth greater than or equal to 160 MHz. In such implementations, the punctured bandwidth may include at least the second portion of the 320 MHz bandwidth.

In some implementations, the punctured channel information may map to a channel puncturing pattern spanning a 160 MHz bandwidth that includes the first portion of the 320 MHz bandwidth and does not overlap with a 160 MHz bandwidth that includes the second portion of the 320 MHz bandwidth. In some other implementations, the punctured channel information may map to a channel puncturing pattern spanning an 80 MHz bandwidth that includes the first portion of the 320 MHz bandwidth.

In some implementations, the first PPDU may conform with a non-legacy PPDU format for non-orthogonal frequency division multiple access (non-OFDMA) transmission. In such implementations, the punctured channel information may comprise 6 bits in a universal signal field (U-SIG) of the PHY preamble of the first PPDU.

In some implementations, the first PPDU may conform with a first PPDU format and the second PPDU may conform with a second PPDU format. In some implementations, the PHY preamble of the first PPDU may include a first spatial reuse field and the PHY preamble of the second PPDU may include a second spatial reuse field, where the first spatial reuse field has the same spatial reuse value as the second spatial reuse field.

Figure 12:
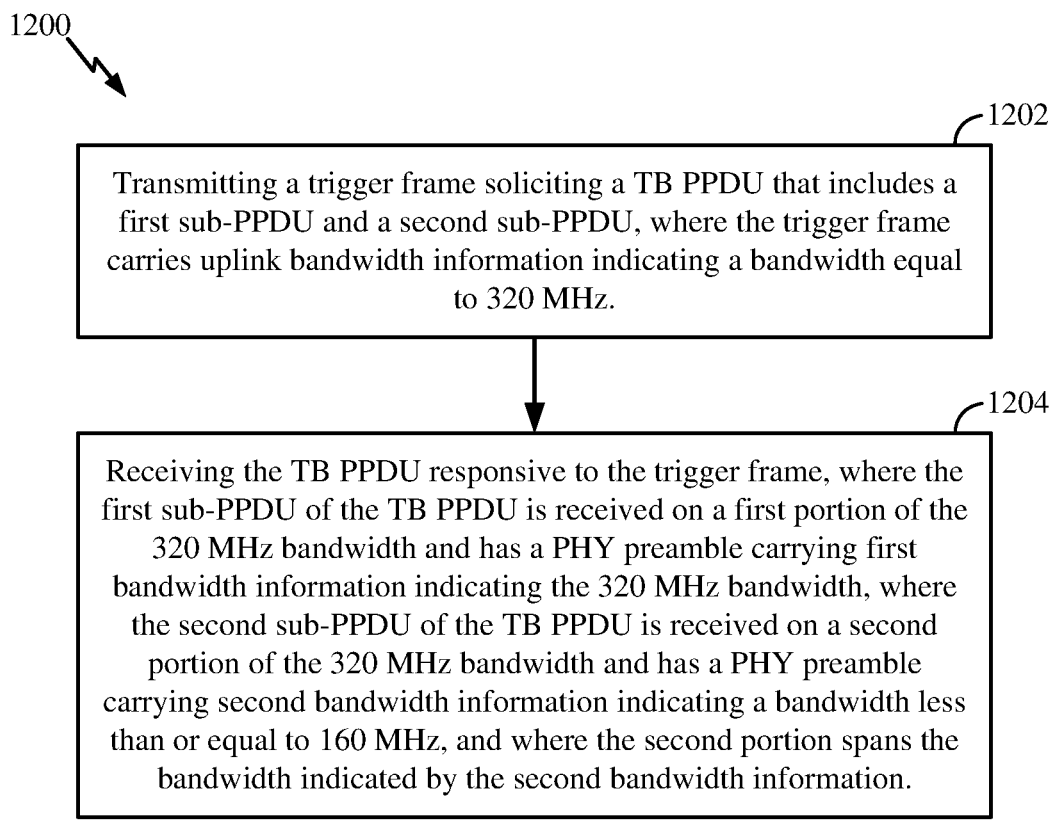
FIG. 12 shows a flowchart illustrating an example process for wireless communication that supports bandwidth indications for a secondary 160 MHz channel according to some implementations.

FIG. 12 shows a flowchart illustrating an example process 1200 for wireless communication that supports bandwidth indications for a secondary 160 MHz channel according to some implementations. In some implementations, the process 1200 may be performed by a wireless communication device operating as or within an AP, such as one of the APs 102 or 502 described above with reference to FIGS. 1 and 5A, respectively.

In some implementations, the process 1200 begins in block 1202 with transmitting a trigger frame soliciting a TB PPDU that includes a first sub-PPDU and a second sub-PPDU, where the trigger frame carries uplink bandwidth information indicating a bandwidth equal to 320 MHz. In block 1204, the process 1200 proceeds with receiving the TB PPDU responsive to the trigger frame, where the first sub-PPDU of the TB PPDU is received on a first portion of the 320 MHz bandwidth and has a PHY preamble carrying first bandwidth information indicating the 320 MHz bandwidth, where the second sub-PPDU of the TB PPDU is received on a second portion of the 320 MHz bandwidth and has a PHY preamble carrying second bandwidth information indicating a bandwidth less than or equal to 160 MHz, and where the second portion spans the bandwidth indicated by the second bandwidth information. In some aspects, the second portion may be located within a primary 160 MHz sub-band of the 320 MHz bandwidth and the first portion may be located within a secondary 160 MHz sub-band of the 320 MHz bandwidth.

In some aspects, the first sub-PPDU may conform with a first PPDU format and the sub-second PPDU may conform with a second PPDU format. In some implementations, the PHY preamble of the first sub-PPDU may include a first spatial reuse field associated with the second portion of the 320 MHz bandwidth and the PHY preamble of the second sub-PPDU may include a plurality of second spatial reuse fields associated with the second portion of the 320 MHz bandwidth. In some implementations, the plurality of second spatial reuse fields may be associated with a respective plurality spatial reuse values, where the first spatial reuse field has a spatial reuse value equal to the smallest of the plurality of spatial reuse values.

In some implementations, at least one of the plurality of second spatial reuse fields may have a value indicating that parameterized spatial reuse (PSR) and non-spatial reuse group (non-SRG) overlapping basic service set (OBSS) packet detection (PD)-based spatial reuse are prohibited during transmission of the TB PPDU, where the first spatial reuse field may also have a value indicating that PSR and non-SRG OBSS PD-based spatial reuse are prohibited during the transmission of the TB PPDU.

In some implementations, at least one of the second spatial reuse fields has a value indicating that PSR is prohibited during transmission of the TB PPDU, where the first spatial reuse field also has a value indicating that PSR is prohibited during transmission of the TB PPDU. In such implementations, none of the plurality of second spatial reuse fields may have a value indicating that non-SRG OBSS PD-based spatial reuse is prohibited during transmission of the TB PPDU.

Figure 13:
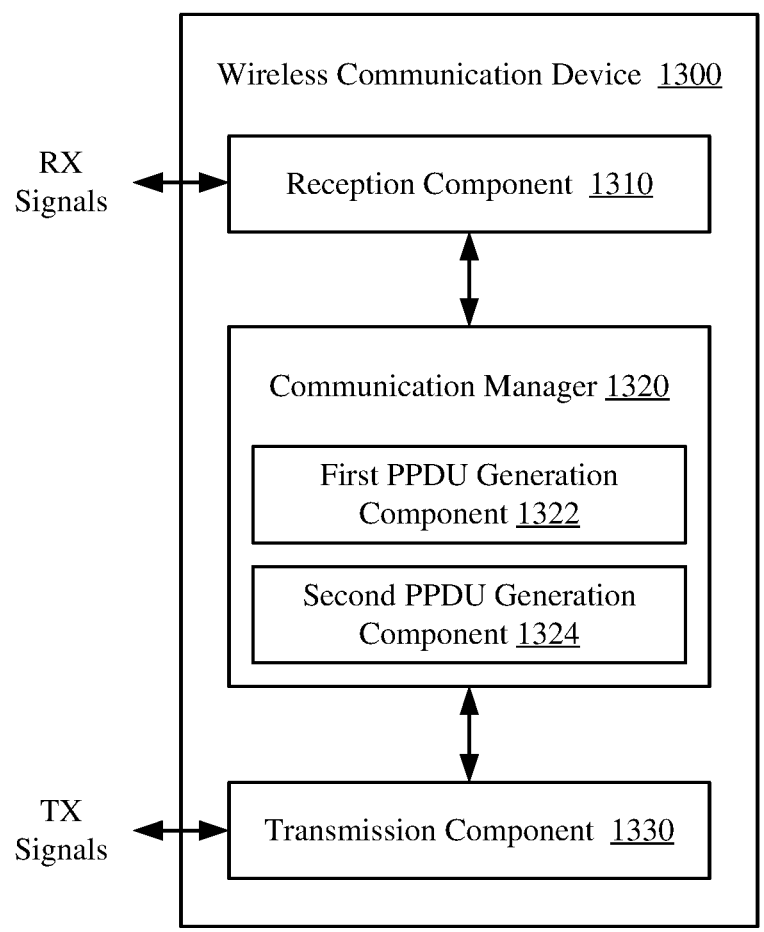
FIG. 13 shows a block diagram of an example wireless communication device according to some implementations.

FIG. 13 shows a block diagram of an example wireless communication device 1300 according to some implementations. In some implementations, the wireless communication device 1300 is configured to perform the process 1100 described above with reference to FIG. 11. The wireless communication device 1300 can be an example implementation of the wireless communication device 400 described above with reference to FIG. 4. For example, the wireless communication device 1300 can be a chip, SoC, chipset, package or device that includes at least one processor and at least one modem (for example, a Wi-Fi (IEEE 802.11) modem or a cellular modem).

The wireless communication device 1300 includes a reception component 1310, a communication manager 1320, and a transmission component 1330. The communication manager 1320 further includes a first PPDU generation component 1322 and a second PPDU generation component 1324. Portions of one or more of the components 1322 and 1324 may be implemented at least in part in hardware or firmware. In some implementations, at least some of the components 1322 or 1324 are implemented at least in part as software stored in a memory (such as the memory 408). For example, portions of one or more of the components 1322 and 1324 can be implemented as non-transitory instructions (or "code") executable by a processor (such as the processor 406) to perform the functions or operations of the respective component.

The reception component 1310 is configured to receive RX signals, over a wireless channel, from one or more other wireless communication devices. The communication manager 1320 is configured to control or manage communications with the one or more other wireless communication devices. In some implementations, the first PPDU generation component 1322 may generate a first PPDU having a PHY preamble that carries first bandwidth information indicating a bandwidth associated with the first PPDU, where the bandwidth indicated by the first bandwidth information is equal to 320 MHz; and the second PPDU generation component 1324 may generate a second PPDU having a PHY preamble that carries second bandwidth information indicating a bandwidth associated with the second PPDU, where the bandwidth indicated by the second bandwidth information is less than or equal to 160 MHz. The transmission component 1330 is configured to transmit TX signals, over the wireless channel, to one or more other wireless communication devices. In some implementations, the transmission component 1330 may transmit the first PPDU and the second PPDU concurrently over the 320 MHz bandwidth in an A-PPDU, where the first PPDU is transmitted on a first portion of the 320 MHz bandwidth and the second PPDU is transmitted on a second portion of the 320 MHz bandwidth, where the second portion spans the bandwidth indicated by the second bandwidth information.

Figure 14:
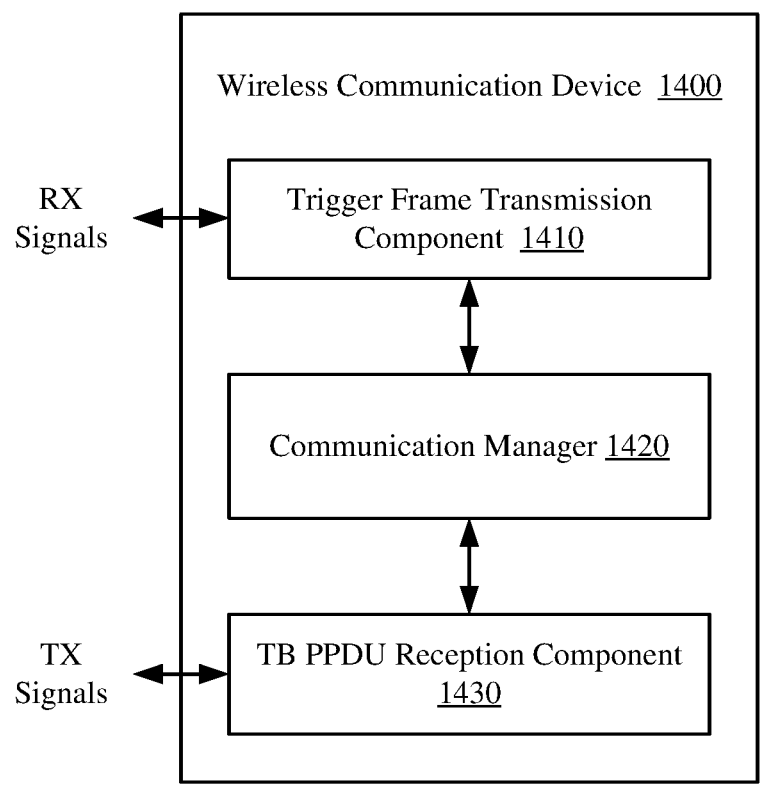
FIG. 14 shows a block diagram of an example wireless communication device according to some implementations.

FIG. 14 shows a block diagram of an example wireless communication device 1400 according to some implementations. In some implementations, the wireless communication device 1400 is configured to perform the process 1200 described above with reference to FIG. 12. The wireless communication device 1400 can be an example implementation of the wireless communication device 400 described above with reference to FIG. 4. For example, the wireless communication device 1400 can be a chip, SoC, chipset, package or device that includes at least one processor and at least one modem (for example, a Wi-Fi (IEEE 802.11) modem or a cellular modem).

The wireless communication device 1400 includes a trigger frame transmission component 1410, a communication manager 1420, and a TB PPDU reception component 1430. Portions of one or more of the components 1410 and 1430 may be implemented at least in part in hardware or firmware. In some implementations, at least some of the components 1410 or 1430 are implemented at least in part as software stored in a memory (such as the memory 408). For example, portions of one or more of the components 1410 and 1430 can be implemented as non-transitory instructions (or "code") executable by a processor (such as the processor 406) to perform the functions or operations of the respective component.

The trigger frame transmission component 1410 is configured to transmit TX signals, over a wireless channel, to one or more other wireless communication devices. In some implementations, the trigger frame transmission component 1410 may transmit a trigger frame soliciting a TB PPDU that includes a first sub-PPDU and a second sub-PPDU, where the trigger frame carries uplink bandwidth information indicating a bandwidth equal to 320 MHz. The communication manager 1420 is configured to control or manage communications with the one or more other wireless communication devices. The TB PPDU reception component 1430 is configured to receive RX signals, over the wireless channel, from one or more other wireless communication devices. In some implementations, the TB PPDU reception component 1430 may receive the TB PPDU responsive to the trigger frame, where the first sub-PPDU of the TB PPDU is received on a first portion of the 320 MHz bandwidth and has a PHY preamble carrying first bandwidth information indicating the 320 MHz bandwidth, where the second sub-PPDU of the TB PPDU is received on a second portion of the 320 MHz bandwidth and has a PHY preamble carrying second bandwidth information indicating a bandwidth less than or equal to 160 MHz, and where the second portion spans the bandwidth indicated by the second bandwidth information.

Implementation examples are described in the following numbered clauses:

1. A method for wireless communication by a wireless communication device, including:

generating a first physical layer (PHY) convergence protocol (PLCP) protocol data unit (PPDU) having a PHY preamble that carries first bandwidth information indicating a bandwidth associated with the first PPDU, the bandwidth indicated by the first bandwidth information being equal to 320 MHz;

generating a second PPDU having a PHY preamble that carries second bandwidth information indicating a bandwidth associated with the second PPDU, the bandwidth indicated by the second bandwidth information being less than or equal to 160 MHz; and transmitting the first PPDU and the second PPDU concurrently over the 320 MHz bandwidth in an aggregated PPDU (A-PPDU), the first PPDU being transmitted on a first portion of the 320 MHz bandwidth and the second PPDU being transmitted on a second portion of the 320 MHz bandwidth, the second portion spanning the bandwidth indicated by the second bandwidth information.

2. The method of clause 1, where the PHY preamble of the first PPDU further carries resource unit (RU) allocation information indicating one or more RUs or multiple RUs (MRUs) allocated for one or more respective users associated with the first PPDU, each of the one or more RUs or MRUs being allocated within the first portion of the 320 MHz bandwidth.

3. The method of clause 1, where the PHY preamble of the first PPDU further carries punctured channel information indicating one or more punctured channels representing a punctured bandwidth greater than or equal to 160 MHz.

4. The method of any of clauses 1 or 3, where the punctured bandwidth includes at least the second portion of the 320 MHz bandwidth.

5. The method of any of clauses 1, 3, or 4, where the punctured channel information maps to a channel puncturing pattern spanning a 160 MHz bandwidth that includes the first portion of the 320 MHz bandwidth and does not overlap with a 160 MHz bandwidth that includes the second portion of the 320 MHz bandwidth.

6. The method of any of clauses 1, 3, or 4, where the punctured channel information maps to a channel puncturing pattern spanning an 80 MHz bandwidth that includes the first portion of the 320 MHz bandwidth.

7. The method of clause 1 or 3-6, where the first PPDU conforms with a non-legacy PPDU format for non-orthogonal frequency division multiple access (non-OFDMA) transmission.

8. The method of any of clauses 1 or 3-7, where the punctured channel information comprises 6 bits in a universal signal field (U-SIG) of the PHY preamble of the first PPDU.

9. The method of any of clauses 1-8, where the first PPDU conforms with a first PPDU format and the second PPDU conforms with a second PPDU format.

10. The method of any of clauses 1-9, where the PHY preamble of the first PPDU includes a first spatial reuse field and the PHY preamble of the second PPDU includes a second spatial reuse field, the first spatial reuse field having the same spatial reuse value as the second spatial reuse field.

11. The method of any of clauses 1-10, where the second portion is located within a primary 160 MHz channel of the 320 MHz bandwidth and the first portion is located within a secondary 160 MHz channel of the 320 MHz bandwidth.

12. A wireless communication device including:

at least one modem;

at least one processor communicatively coupled with the at least one modem; and at least one memory communicatively coupled with the at least one processor and storing processor-readable code that, when executed by the at least one processor in conjunction with the at least one modem, is configured to perform the method of any one or more of clauses 1-11.

13. A method for wireless communication performed by a wireless communication device, including:

transmitting a trigger frame soliciting a trigger-based (TB) physical layer (PHY) convergence protocol (PLCP) protocol data unit (PPDU) that includes a first sub-PPDU and a second sub-PPDU, the trigger frame carrying uplink bandwidth information indicating a bandwidth equal to 320 MHz; and receiving the TB PPDU responsive to the trigger frame, the first sub-PPDU of the TB PPDU being received on a first portion of the 320 MHz bandwidth and having a PHY preamble carrying first bandwidth information indicating the 320 MHz bandwidth, the second sub-PPDU of the TB PPDU being received on a second portion of the 320 MHz bandwidth and having a PHY preamble carrying second bandwidth information indicating a bandwidth less than or equal to 160 MHz, the second portion spanning the bandwidth indicated by the second bandwidth information.

14. The method of clause 13, where the first sub-PPDU conforms with a first PPDU format and the sub-second PPDU conforms with a second PPDU format.

15. The method of any of clauses 13 or 14, where the PHY preamble of the first sub-PPDU includes a first spatial reuse field associated with the second portion of the 320 MHz bandwidth and the PHY preamble of the second sub-PPDU includes a plurality of second spatial reuse fields associated with the second portion of the 320 MHz bandwidth.

16. The method of any of clauses 13-15, where the plurality of second spatial reuse fields is associated with a respective plurality of spatial reuse values, the first spatial reuse field having a spatial reuse value equal to the smallest of the plurality of spatial reuse values.

17. The method of any of clauses 13-15, where at least one of the plurality of second spatial reuse fields has a value indicating that parameterized spatial reuse (PSR) and non-spatial reuse group (non-SRG) overlapping basic service set (OBSS) packet detection (PD)-based spatial reuse are prohibited during transmission of the TB PPDU, the first spatial reuse field also having a value indicating that PSR and non-SRG OBSS PD-based spatial reuse are prohibited during transmission of the TB PPDU.

18. The method of any of clauses 13-15, where at least one of the second spatial reuse fields has a value indicating that PSR is prohibited during transmission of the TB PPDU, the first spatial reuse field also having a value indicating that PSR is prohibited during transmission of the TB PPDU.

19. The method of clause 13-15 or 18, where none the plurality of second spatial reuse fields has a value indicating that non-SRG OBSS PD-based spatial reuse is prohibited during transmission of the TB PPDU.

20. The method of any of clauses 13-19, where the second portion is located within a primary 160 MHz channel of the 320 MHz bandwidth and the first portion is located within a secondary 160 MHz channel of the 320 MHz bandwidth.

21. A wireless communication device including:
    at least one modem;
    at least one processor communicatively coupled with the at least one modem; and
    at least one memory communicatively coupled with the at least one processor and storing processor-readable code that, when executed by the at least one processor in conjunction with the at least one modem, is configured to perform the method of any one or more of clauses 13-20.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication performed by a wireless communication device, comprising:
    generating a first physical layer (PHY) convergence protocol (PLCP) protocol data unit (PPDU) having a PHY preamble that carries first bandwidth information indicating a bandwidth associated with the first PPDU being equal to 320 MHz, carries punctured channel information indicating one or more punctured channels representing a punctured bandwidth greater than or equal to 160 MHz, and includes a common field and a user specific field, wherein the common field includes a resource unit (RU) allocation field that carries RU allocation information indicating one or more multiple RUs (MRUs) allocated for one or more respective users associated with the first PPDU;
    generating a second PPDU having a PHY preamble that carries second bandwidth information indicating a bandwidth associated with the second PPDU, the bandwidth indicated by the second bandwidth information being less than or equal to 160 MHz, the PHY preamble of the first PPDU including a first spatial reuse field associated with a second portion of the 320 MHz bandwidth, and the PHY preamble of the second PPDU including a plurality of second spatial reuse fields associated with the second portion of the 320 MHz bandwidth; and
    transmitting the first PPDU and the second PPDU concurrently over the 320 MHz bandwidth in an aggregated PPDU (A-PPDU), the first PPDU being transmitted on a first portion of the 320 MHz bandwidth and the second PPDU being transmitted on the second portion of the 320 MHz bandwidth, the second portion spanning the bandwidth indicated by the second bandwidth information.

2. The method of claim 1, wherein each of the one or more MRUs is allocated within the first portion of the 320 MHz bandwidth.

3. The method of claim 1, wherein the PHY preamble of the first PPDU comprises a universal signal field (U-SIG) that indicates the one or more punctured channels representing the punctured bandwidth greater than or equal to 160 MHz.

4. The method of claim 3, wherein the punctured bandwidth includes at least the second portion of the 320 MHz bandwidth.

5. The method of claim 3, wherein the punctured channel information maps to a channel puncturing pattern spanning a 160 MHz bandwidth that includes the first portion of the 320 MHz bandwidth and does not overlap with a 160 MHz bandwidth that includes the second portion of the 320 MHz bandwidth.

6. The method of claim 3, wherein the punctured channel information maps to a channel puncturing pattern spanning an 80 MHz bandwidth that includes the first portion of the 320 MHz bandwidth.

7. The method of claim 3, wherein the first PPDU conforms with a non-legacy PPDU format for non-orthogonal frequency division multiple access (non-OFDMA) transmission.

8. The method of claim 7, wherein the punctured channel information comprises 6 bits in the U-SIG of the PHY preamble of the first PPDU.

9. The method of claim 1, wherein the first PPDU conforms with a first PPDU format and the second PPDU conforms with a second PPDU format.

10. The method of claim 1, wherein a second spatial reuse field of the plurality of second spatial reuse fields and the first spatial reuse field have a same spatial reuse value.

11. The method of claim 1, wherein the second portion is located within a primary 160 MHz channel of the 320 MHz bandwidth and the first portion is located within a secondary 160 MHz channel of the 320 MHz bandwidth.

12. An apparatus for wireless communication at a wireless communication device, comprising:
a processing system that includes one or more processors and one or more memories coupled with the one or more processors, the processing system configured to cause the apparatus to:
generate a first physical layer (PHY) convergence protocol (PLCP) protocol data unit (PPDU) having a PHY preamble that carries first bandwidth information indicating a bandwidth associated with the first PPDU being equal to 320 MHz, carries punctured channel information indicating one or more punctured channels representing a punctured bandwidth greater than or equal to 160 MHz, and includes a common field and a user specific field, wherein the common field includes a resource unit (RU) allocation field that carries RU allocation information indicating one or more multiple RUs (MRUs) allocated for one or more respective users associated with the first PPDU;
generate a second PPDU having a PHY preamble that carries second bandwidth information indicating a bandwidth associated with the second PPDU, the bandwidth indicated by the second bandwidth information being less than or equal to 160 MHz, the PHY preamble of the first PPDU including a first spatial reuse field associated with a second portion of the 320 MHz bandwidth, and the PHY preamble of the second PPDU including a plurality of second spatial reuse fields associated with the second portion of the 320 MHz bandwidth; and
transmit the first PPDU and the second PPDU concurrently over the 320 MHz bandwidth in an aggregated PPDU (A-PPDU), the first PPDU being transmitted on a first portion of the 320 MHz bandwidth and the second PPDU being transmitted on the second portion of the 320 MHz bandwidth, the second portion spanning the bandwidth indicated by the second bandwidth information.

13. The apparatus of claim 12, wherein each of the one or more MRUs is allocated within the first portion of the 320 MHz bandwidth.

14. The apparatus of claim 12, wherein the punctured bandwidth includes at least the second portion of the 320 MHz bandwidth.

15. The apparatus of claim 14, wherein the punctured channel information maps to a channel puncturing pattern spanning a 160 MHz bandwidth that includes the first portion of the 320 MHz bandwidth and does not overlap with a 160 MHz bandwidth that includes the second portion of the 320 MHz bandwidth.

16. The apparatus of claim 14, wherein the punctured channel information maps to a channel puncturing pattern spanning an 80 MHz bandwidth that includes the first portion of the 320 MHz bandwidth.

17. The apparatus of claim 12, wherein the PHY preamble of the first PPDU includes a first spatial reuse field and the PHY preamble of the second PPDU includes a second spatial reuse field, the first spatial reuse field having a same spatial reuse value as the second spatial reuse field.

18. A method for wireless communication performed by a wireless communication device, comprising:
transmitting a trigger frame soliciting a trigger-based (TB) physical layer (PHY) convergence protocol (PLCP) protocol data unit (PPDU) that includes a first sub-PPDU and a second sub-PPDU, the trigger frame carrying uplink bandwidth information indicating a bandwidth equal to 320 MHz; and
receiving the TB PPDU responsive to the trigger frame, the first sub-PPDU of the TB PPDU being received on a first portion of the 320 MHz bandwidth and having a PHY preamble that carries first bandwidth information indicating the 320 MHz bandwidth, carries punctured channel information indicating one or more punctured channels representing a punctured bandwidth greater than or equal to 160 MHz, and includes a common field and a user specific field, wherein the common field includes a resource unit (RU) allocation field that carries RU allocation information indicating one or more multiple RUs (MRUs), the second sub-PPDU of the TB PPDU being received on a second portion of the 320 MHz bandwidth and having a PHY preamble carrying second bandwidth information indicating a bandwidth less than or equal to 160 MHz, the second portion spanning the bandwidth indicated by the second bandwidth information, the PHY preamble of the first sub-PPDU including a first spatial reuse field associated with the second portion of the 320 MHz bandwidth and the PHY preamble of the second sub-PPDU including a plurality of second spatial reuse fields associated with the second portion of the 320 MHz bandwidth.

19. The method of claim 18, wherein the first sub-PPDU conforms with a first PPDU format and the second sub-PPDU conforms with a second PPDU format.

20. The method of claim 18, wherein the second portion is located within a primary 160 MHz channel of the 320 MHz bandwidth and the first portion is located within a secondary 160 MHz channel of the 320 MHz bandwidth.

21. The method of claim 18, wherein the plurality of second spatial reuse fields is associated with a respective plurality of spatial reuse values, the first spatial reuse field having a spatial reuse value equal to a smallest of the plurality of spatial reuse values.

22. The method of claim 18, wherein at least one of the plurality of second spatial reuse fields has a value indicating that parameterized spatial reuse (PSR) and non-spatial reuse group (non-SRG) overlapping basic service set (OBSS) packet detection (PD)-based spatial reuse are prohibited during transmission of the TB PPDU, the first spatial reuse field also having a value indicating that PSR and non-SRG OBSS PD-based spatial reuse are prohibited during transmission of the TB PPDU.

23. The method of claim 18, wherein at least one of the second spatial reuse fields has a value indicating that PSR is prohibited during transmission of the TB PPDU, the first spatial reuse field also having a value indicating that PSR is prohibited during transmission of the TB PPDU.

24. The method of claim 23, wherein none the plurality of second spatial reuse fields has a value indicating that non-SRG OBSS PD-based spatial reuse is prohibited during transmission of the TB PPDU.

25. An apparatus for wireless communication at a wireless communication device, comprising:
a processing system that includes one or more processors and one or more memories coupled with the one or more processors, the processing system configured to cause the apparatus to:
transmit a trigger frame soliciting a trigger-based (TB) physical layer (PHY) convergence protocol (PLCP) protocol data unit (PPDU) that includes a first sub-PPDU and a second sub-PPDU, the trigger frame carrying uplink bandwidth information indicating a bandwidth equal to 320 MHz; and
receive the TB PPDU responsive to the trigger frame, the first sub-PPDU of the TB PPDU being received on a first portion of the 320 MHz bandwidth and having a PHY preamble that carries first bandwidth information indicating the 320 MHz bandwidth, carries punctured channel information indicating one or more punctured channels representing a punctured bandwidth greater than or equal to 160 MHz, and includes a common field and a user specific field, wherein the common field includes a resource unit (RU) allocation field that carries RU allocation information indicating one or more multiple RUs (MRUs), the second sub-PPDU of the TB PPDU being received on a second portion of the 320 MHz bandwidth and having a PHY preamble carrying second bandwidth information indicating a bandwidth less than or equal to 160 MHz, the second portions panning the bandwidth indicated by the second bandwidth information, the PHY preamble of the first sub-PPDU including a first spatial reuse field associated with the second portion of the 320 MHz bandwidth and the PHY preamble of the second sub-PPDU including a plurality of second spatial reuse fields associated with the second portion of the 320 MHz bandwidth.

26. The apparatus of claim 25, wherein the first sub-PPDU conforms with a first PPDU format and the second sub-PPDU conforms with a second PPDU format.

27. The apparatus of claim 26, wherein the plurality of second spatial reuse fields have a respective plurality spatial reuse values, and the first spatial reuse field has a spatial reuse value equal to a smallest of the plurality of spatial reuse values.

28. The apparatus of claim 26, wherein the PHY preamble of the first sub-PPDU includes a first spatial reuse field associated with the second portion of the 320 MHz bandwidth and the PHY preamble of the second sub-PPDU includes a plurality of second spatial reuse fields associated with the second portion of the 320 MHz bandwidth, the first spatial reuse field and at least one of the plurality of second spatial reuse fields having a value indicating that parameterized spatial reuse (PSR) and non-spatial reuse group (non-SRG) overlapping basic service set (OBSS) packet detection (PD)-based spatial reuse are prohibited during transmission of the TB PPDU.

29. The apparatus of claim 26, wherein the PHY preamble of the first sub-PPDU includes a first spatial reuse field associated with the second portion of the 320 MHz bandwidth and the PHY preamble of the second sub-PPDU includes a plurality of second spatial reuse fields associated with the second portion of the 320 MHz bandwidth, none the plurality of second spatial reuse fields having a value indicating that non-SRG OBSS PD-based spatial reuse is prohibited during transmission of the TB PPDU, the first spatial reuse field and at least one of the second spatial reuse fields having a value indicating that PSR is prohibited during transmission of the TB PPDU.

* * * * *